(12) United States Patent
Larsen et al.

(10) Patent No.: US 11,438,720 B2
(45) Date of Patent: Sep. 6, 2022

(54) THREE-DIMENSIONAL (3D) AUDIO INTERACTION FOR VEHICLES

(71) Applicant: SONY GROUP CORPORATION, Tokyo (JP)

(72) Inventors: Tonni Larsen, San Diego, CA (US); Ted Yamazaki, San Diego, CA (US); Leigh Anderson, Novi, MI (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/187,391

(22) Filed: Feb. 26, 2021

(65) Prior Publication Data

US 2022/0116725 A1 Apr. 14, 2022

Related U.S. Application Data

(60) Provisional application No. 63/089,408, filed on Oct. 8, 2020.

(51) Int. Cl.
| | |
|---|---|
| *H04S 7/00* | (2006.01) |
| *H04R 5/04* | (2006.01) |
| *B60R 11/02* | (2006.01) |
| *H04R 3/12* | (2006.01) |
| *G06V 20/58* | (2022.01) |

(52) U.S. Cl.
CPC ............ *H04S 7/30* (2013.01); *B60R 11/0217* (2013.01); *G06V 20/58* (2022.01); *H04R 3/12* (2013.01); *H04R 5/04* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 6,087,961 A | * | 7/2000 | Markow | G08G 1/0965 340/902 |
| 8,104,945 B2 | | 1/2012 | Kim et al. | |
| 8,682,004 B2 | | 3/2014 | Grigsby et al. | |
| 9,224,294 B1 | * | 12/2015 | St. John | G08G 1/0965 |
| 9,896,031 B1 | * | 2/2018 | Groh | B60Q 9/008 |
| 9,956,910 B2 | * | 5/2018 | McNew | B60Q 9/008 |

(Continued)

OTHER PUBLICATIONS https://www.youtube.com/watch?v=ZgUQxy-vdZI.
https://www.youtube.com/watch?v=UAxhMflrQs8&feature=youtu.be.

*Primary Examiner* — Paul W Huber
(74) *Attorney, Agent, or Firm* — Chip Law Group

(57) ABSTRACT

A system in a first vehicle includes a plurality of sensors, a plurality of audio output devices and circuitry. The circuitry receives a plurality of signals from the plurality of sensors. The circuitry determines a relative position between a first device and the first vehicle based on the received plurality of signals or a geo-location of the first vehicle. The circuitry receives first information from the first device based on the determined relative position between the first device and the first vehicle, and at least one selection criterion. The circuitry generates a first three-dimensional (3D) audio object corresponding to the received first information. The circuitry controls, based on the determined relative position, a first set of audio output devices of the plurality of audio output devices to output the generated first 3D audio object, in a 3D space of the first vehicle at a first time instant.

20 Claims, 10 Drawing Sheets

(56) References Cited

U.S. PATENT DOCUMENTS

| | | | |
|---|---|---|---|
| 10,882,538 B1* | 1/2021 | Witt | G01S 15/931 |
| 2007/0132608 A1* | 6/2007 | Votaw | G08G 1/0965 |
| | | | 340/903 |
| 2008/0238723 A1* | 10/2008 | Fein | G06Q 30/0255 |
| | | | 340/988 |
| 2009/0119014 A1* | 5/2009 | Caplan | G01S 19/51 |
| | | | 701/469 |
| 2011/0199199 A1* | 8/2011 | Perkins | B60Q 9/008 |
| | | | 340/435 |
| 2017/0096104 A1* | 4/2017 | Kelly | G08G 1/166 |
| 2019/0137622 A1* | 5/2019 | Lopez-Hinojosa | G01S 13/865 |
| 2020/0204966 A1 | 6/2020 | Thagadur Shivappa et al. | |

* cited by examiner

THREE-DIMENSIONAL (3D) AUDIO INTERACTION FOR VEHICLES

CROSS-REFERENCE TO RELATED APPLICATIONS/INCORPORATION BY REFERENCE

This application claims priority to U.S. Provisional Patent Application Ser. No. 63/089,408 filed on Oct. 8, 2020, the entire content of which is hereby incorporated herein by reference.

FIELD

Various embodiments of the disclosure relate to three-dimensional (3D) audio effect for a vehicle. More specifically, various embodiments of the disclosure relate to a system and method for 3D audio interaction for a vehicle.

BACKGROUND

Recent advancements in the field of automobiles have led to development of various advanced features for vehicles, such as, infotainment systems for the vehicles. However, conventional infotainment systems are designed to merely provide audio or video entertainment to an occupant of the vehicle. While taking a ride, the occupant of the vehicle may miss relevant information, such as nearby places of interest, attractions, popular restaurants, or in some cases emergency warning signs placed by an authority. For example, the emergency warning signs may be related to avoidance of a specific travel route due to a road hazard or a blockage. In another example, a nearby theater may be offering promotional sale of tickets for an entertainment show or a nearby restaurant may be offering happy hour discounts, which may be of interest to the occupant of the vehicle, but not apparent to the occupant while riding the vehicle. Thus, there is a need for a system that may intuitively and non-intrusively provide relevant and useful information to the occupant of the vehicle while riding the vehicle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for three-dimensional (3D) audio interaction for a vehicle is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
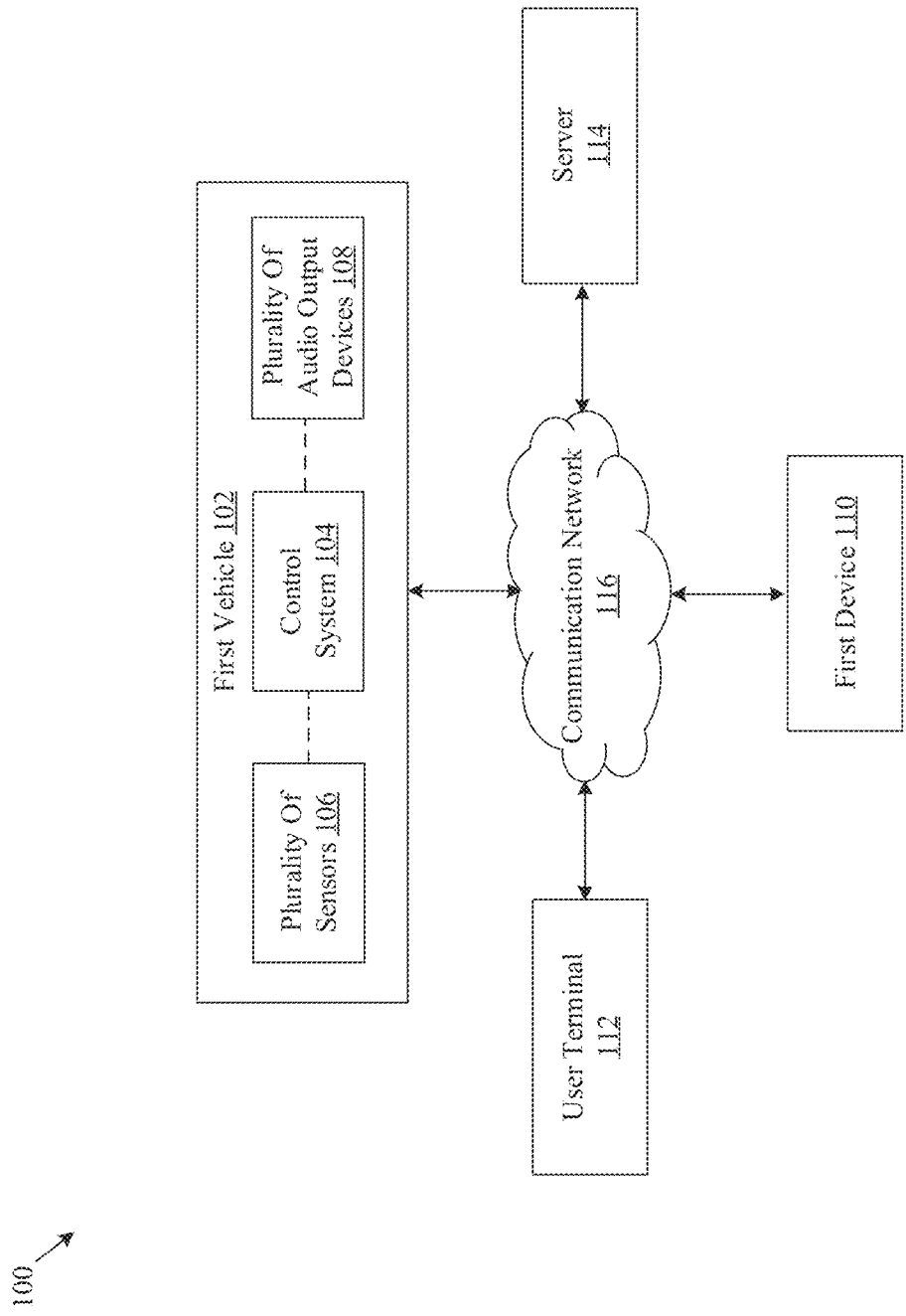
FIG. 1 is a block diagram that illustrates an exemplary network environment for three-dimensional (3D) audio interaction for a first vehicle, in accordance with an embodiment of the disclosure.

The following described implementations may be found in the disclosed system and method for three-dimensional (3D) audio interaction for a vehicle. Exemplary aspects of the disclosure provide a system (such as a control system) which may be implemented in a vehicle (such as a first vehicle). The system may receive a plurality of signals from a plurality of sensors. The plurality of sensors (such as an imaging sensor, a light detection and ranging sensor, and an ultrasonic sensor) may be positioned at different positions on the first vehicle. The system may further determine a relative position between a first device and the first vehicle based on the received plurality of signals or a geo-location of the first vehicle. For example, the first device may be associated with a business entity, an emergency regularity authority, or a second vehicle. The system may further receive first information from the first device based on the determined relative position between the first device and the first vehicle, and at least one selection criterion. For example, the first information may correspond to a promotional notification associated with the business entity, a notification related to an emergency from the emergency regularity authority, or information of media content being played in the second vehicle. In an example, the selection criterion may be based on a user preference of a first occupant of the first vehicle or a set priority of the business entity close to the geo-location of the first vehicle. Thus, the system may enable receipt of the first information from the business entity and exchange of information with other vehicles (such as the second vehicle) present within a threshold distance from the first vehicle.

The system may further generate a first 3D audio object corresponding to the received first information. The system may further control, based on the determined relative position, a first set of audio output devices of the plurality of audio output devices to output the generated first 3D audio object, in a 3D space of the first vehicle at a first time instant. The system may control the first set of audio output devices to output the first 3D audio object in the 3D space of the first vehicle in such a manner that a sound alert or a verbal notification may appear to originate from a direction of the business entity or the second vehicle. Thus, the system may enable 3D audio interaction for the first vehicle such that the first occupant of the first vehicle may non-intrusively receive the first information and intuitively recognize the direction of source of the first information. The system thereby provides useful and relevant information to the first occupant in an effective manner while the first occupant is riding the first vehicle. Thus, the occupant of the first vehicle may not miss relevant information related to nearby places of interest (e.g. promotional sale of tickets for an entertainment show), attractions (e.g. a tourist spot), popular restaurants (e.g. happy hour discounts), or emergency warnings (e.g. road hazard or a blockage on a specific travel route) by an authority. Furthermore, the system may further provide a fun and interactive way of 3D audio interaction with other nearby vehicles by utilizing the plurality of audio output devices to output the first 3D object in the 3D space of the first vehicle.

FIG. 1 is a block diagram that illustrates an exemplary network environment for three-dimensional (3D) audio interaction for a first vehicle, in accordance with an embodiment of the disclosure. With reference to FIG. 1, there is shown a network environment 100. In the network environment 100, there is shown a first vehicle 102. The first vehicle 102 may further include a control system 104 (such as the disclosed system), a plurality of sensors 106 and a plurality of audio output devices 108. In the network environment 100, there is further shown a first device 110, a user terminal 112 and a server 114. In the network environment 100, there is further shown a communication network 116 through which the first vehicle 102, the first device 110, the user terminal 112 and the server 114 may communicate with each other.

The first vehicle 102 may be a non-autonomous vehicle, a semi-autonomous vehicle, or a fully autonomous vehicle, for example, as defined by National Highway Traffic Safety Administration (NHTSA). Examples of the first vehicle 102 may include, but are not limited to, a two-wheeler vehicle, a three-wheeler vehicle, a four-wheeler vehicle, a hybrid vehicle, an aerial vehicle (e.g. a passenger drone), a watercraft, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The first vehicle 102 may be a system through which a first occupant (such as a driver) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. It may be noted the present disclosure may be also applicable to other types of vehicles. The description of other types of the vehicle has been omitted from the disclosure for the sake of brevity.

The control system 104 may include suitable logic, circuitry, interfaces, and/or code that may be configured to determine a relative position between the first device 110 and the first vehicle 102 based on at least one of the received plurality of signals or a geo-location of the first vehicle 102. The control system 104 may further receive first information from the first device 110 based on the determined relative position and at least one selection criterion. The control system 104 may further generate a first 3D audio object corresponding to the received first information and control a first set of audio output devices of the plurality of audio output devices 108 to output the generated first 3D audio object, in a 3D space of the first vehicle 102. The control system 104 may further include a display device which may display metadata associated with the first information. The control system 104 may be a specialized electronic circuitry that may be a part of an electronic control unit (ECU) processor to control different functions, such as, but not limited to, engine operations, communication operations, and data acquisition (such as the plurality of signals) of the first vehicle 102. The control system 104 may be a microprocessor. Other examples of the control system 104 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The control system 104 may be included or integrated in the first vehicle 102 as depicted in FIG. 1. In another embodiment, the control system 104 may be separate from the first vehicle 102.

The plurality of sensors 106 may include suitable logic, circuitry, and interfaces that may be configured to generate the plurality of signals, for example, based on detection of a geo-location of the first vehicle 102, a second vehicle, a first device 110 associated with a business entity, a traffic regulatory agency, an emergency regularity entity, or a tourist information center. The plurality of sensors 106 may be positioned at different positions of the first vehicle 102 (shown in FIG. 3). Examples of the plurality of sensors 106 may include but are not limited to, an image sensor, a light detection and ranging sensor, an audio sensor, or a location sensor. Details of the types of plurality of sensors 106 and the position of the plurality of sensors 106 on the first vehicle 102 are further described for example, in FIG. 3.

The plurality of audio output devices 108 may include suitable logic, circuitry, and interfaces that may be configured to output the first 3D audio object in the 3D space of the first vehicle 102. The 3D space of the first vehicle 102 may be an interior space of the first vehicle 102, a space between the first vehicle 102 and the first device 110, or both. The plurality of audio output devices 108 may be configured to output the first 3D audio object as a virtual sound source in the 3D space of the first vehicle 102, which gives the impression that the 3D audio object originates from a position different from the positions of the plurality of audio output devices 108. The 3D audio object may be output as a virtual sound source based on sound localization techniques, such as, head-related transfer function (HRTF), details of which are further described, for example, in FIG. 4A. The plurality of audio output devices 108 may be positioned at different positions of the first vehicle 102 (shown in FIG. 3)), and may be configured to produce sound using multiple audio channels within the 3D space of the first vehicle 102. For example, the plurality of audio output devices 108 may be mounted on a dashboard of the first vehicle 102, doors of the first vehicle 102, interior roof of the first vehicle 102, headrest of a seat of the first vehicle 102, or a helmet, etc. Examples of the plurality of audio output devices 108 may include but are not limited to, component speakers, coaxial speakers and in-vehicle stereo systems.

The first device 110 may include suitable logic, circuitry, and interfaces that may be configured to generate the first information based on the determined relative position between the first device 110 and the first vehicle 102, and at least one selection criterion. The first device 110 may further transmit the first information to the first vehicle 102 through the server 114, broadcast the first information, or execute point-to-point communication of the first information with the first vehicle 102 via the communication network 116. The first device 110 may be associated with one of a business entity, a second vehicle, a traffic regulatory agency, an emergency regularity entity, or a tourist information center. The first information may correspond to at least one of a promotional notification associated with one or more business entities within a threshold distance from the first vehicle 102 based on the determined relative position, or a notification associated with a tourist landmark within the threshold distance from the first vehicle 102. The first information may further correspond to a notification related to an emergency within the threshold distance from the first vehicle 102, a broadcast related to traffic data around the first vehicle 102, or information of media content being played in a second vehicle within the threshold distance from the first vehicle 102. Examples of the first device 110 may include, but are not limited to, a dedicated server, a computing device, a computer work-station, a consumer electronic (CE) device, a smartphone, a cellular phone, a mobile phone, a broadcast station, a radio transceiver, in-vehicle infotainment system of the second vehicle, and/or a mainframe machine.

The user terminal 112 may include suitable logic, circuitry, and interfaces that may be configured to perform operations performed by the control system 104. The user terminal 112 may further provide a user interface for a user, such as the first occupant of the first vehicle 102 to register a user input. The user terminal 112 may further be configured to display metadata associated with the first information and/or recommendation information for reception of the first information. The user terminal 112 may be associated with the first occupant (such as the driver) of the first vehicle 102. The user terminal 112 may include an application (downloadable from the server 114) through which the user terminal 112 may receive user input from the first occupant, and through which the user terminal 112 may display recommendation information to the first occupant. Examples of the user terminal 112 may include, but are not limited to, a smartphone, a computing device, a cellular phone, a mobile phone, a gaming device, a mainframe machine, a server, a computer workstation, and/or a CE device.

The server 114 may include suitable logic, circuitry, and interfaces, and/or code that may be configured to acquire information, such as geo-location of the first vehicle 102. The server 114 may be further configured to provide information, such as, emergency warnings, detour information, and tourist information, based on the geo-location of the first vehicle. The server 114 may be further configured to aggregate information related to multiple places of interest, attractions, restaurants, theaters, and so on, from multiples sources (e.g. news websites, social networking sites, etc.). The server 114 may be configured to communicate with the first vehicle 102 and the user terminal 112 via the communication network 116 to exchange a variety of information such traffic data in a travel route of the first vehicle, user account data associated with the first occupant of the first vehicle 102, system updates for the control system 104, object identification learning data for identification of objects detected by the sensors 106, navigation information, the aggregated information related to multiple places of interest, attractions, restaurants, theaters, and so on. The server 114 may communicate with the first vehicle 102 via the communication network 116. In some embodiments, the server 114 may be further configured to provide the functionalities of the control system 104 as a downloadable application onto the ECU of the first vehicle 102. The server 114 may be implemented as a cloud server and may execute operations through web applications, cloud applications, HTTP requests, repository operations, file transfer, and the like. Other example implementations of the server 114 may include, but are not limited to, a database server, a government based server, a global positioning system (GPS) server, a file server, a web server, a media server, an application server, a mainframe server, or a cloud computing server.

In at least one embodiment, the server 114 may be implemented as a plurality of distributed cloud-based resources by use of several technologies that are well known to those ordinarily skilled in the art. A person with ordinary skill in the art will understand that the scope of the disclosure may not be limited to the implementation of the server 114 and the control system 104 as two separate entities. In certain embodiments, the functionalities of the server 114 can be incorporated in its entirety or at least partially in the control system 104, without departing from the scope of the disclosure.

The communication network 116 may include a communication medium through which the first vehicle 102, the first device 110, the user terminal 112 and the server 114 may communicate with each other. The communication network 116 may be one of a wired connection or a wireless connection. Examples of the communication network 116 may include, but are not limited to, a cellular network, the Internet, a cloud network, a Wireless Fidelity (Wi-Fi) network, a Personal Area Network (PAN), a Local Area Network (LAN), a Metropolitan Area Network (MAN), or a satellite communication network (such as a satellite constellation). Various devices in the network environment 100 may be configured to connect to the communication network 116 in accordance with various wired and wireless communication protocols. Examples of such wired and wireless communication protocols may include, but are not limited to, at least one of long-term evolution (LTE), fifth generation (5G) technology standard for cellular networks, a point-to-point communication, Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth® (BT) communication protocols.

Figure 3:
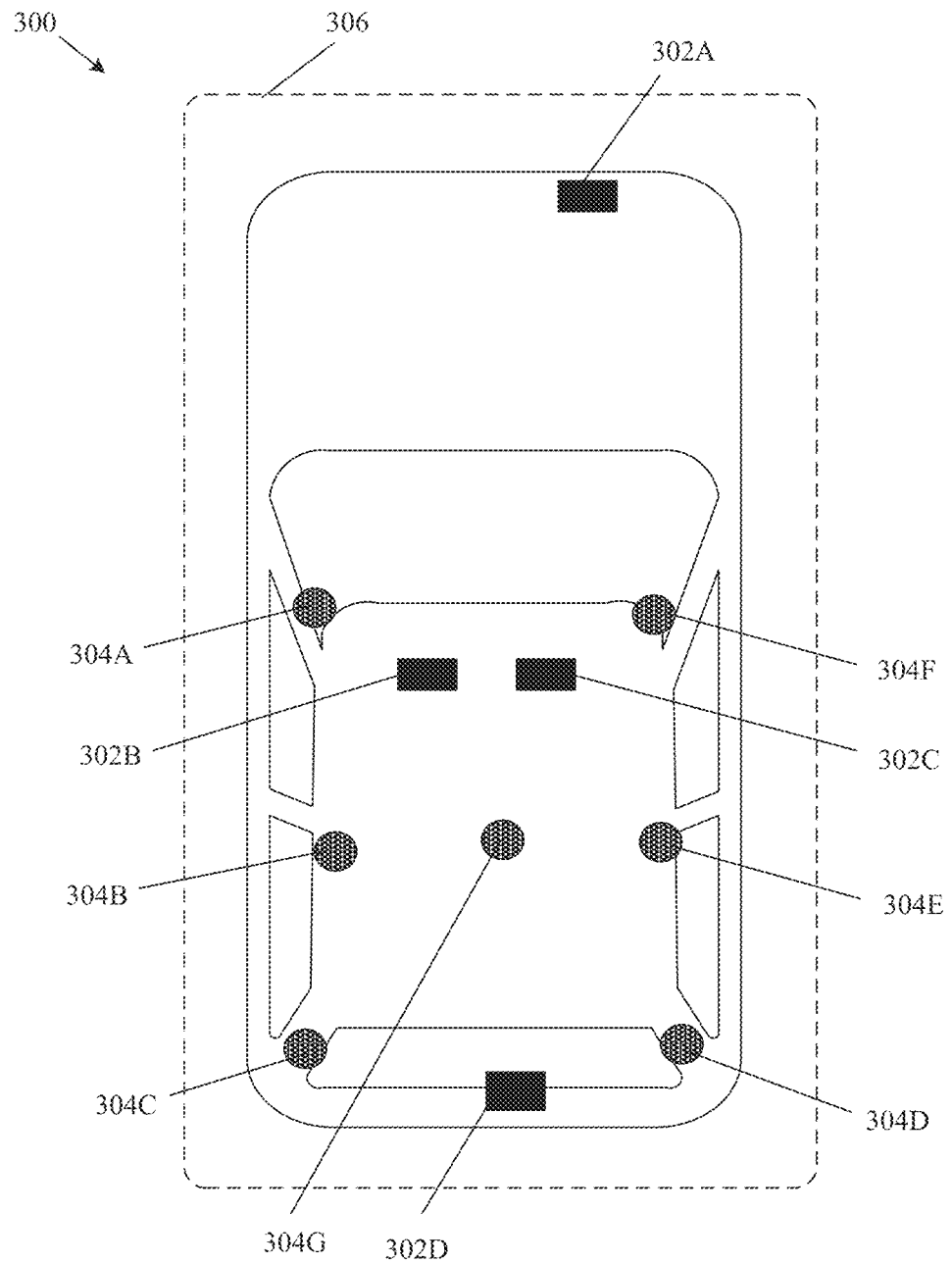
FIG. 3 is an exemplary diagram that illustrates a configuration of a plurality of sensors and a plurality of audio output devices in the first vehicle, in accordance with an embodiment of the disclosure.

In operation, the first vehicle 102 may be travelling on a road. The system (such as the control system 104) of the first vehicle 102 may be configured to receive the plurality of signals from the plurality of sensors 106. The plurality of sensors 106 may be positioned at different positions on the first vehicle 102 (as shown in FIG. 3). The plurality of signals may correspond to detection of the surroundings of the first vehicle 102. For example, the surroundings of the first vehicle 102 may include one or more business entities, one or more second vehicles, or tourist landmarks. The plurality of sensors 106 may record the plurality of signals. The detection result of the plurality of sensors 106 may be output as the plurality of signals. For example, the plurality of signals may include a detection signal corresponding to a geographical location of the first vehicle 102, and a detection signal corresponding to an object, such as, a second vehicle which may be present at a threshold distance from the first vehicle 102. The plurality of signals may be further used to determine the distance of the first vehicle 102 from the one or more business entities, the one or more second vehicles, or the tourist landmarks at a threshold distance from the first vehicle 102. In one or more embodiments, the plurality of signals may be received from the server 114 (for example, a Global Positioning System (GPS) server) for determination of the geo-location of the first vehicle 102. Details of the reception of the plurality of signals are further described for example, in FIG. 3.

The control system 104 may further determine a relative position between the first device 110 and the first vehicle 102 based on at least one of the received plurality of signals or the geo-location of the first vehicle 102. In some embodiments, the first device 110 may be associated with one of the business entity, a second vehicle, a traffic regulatory agency, an emergency regularity entity, or a tourist information center. For example, the relative position of the first device 110 with respect to the first vehicle 102 may be on the left side or the right side of the first vehicle 102 within a predetermined radius of the first vehicle 102. Details of the determination of the relative position between the first device 110 and the first vehicle 102 are further described for example, in FIG. 4A.

The control system 104 may further receive first information from the first device 110 based on the determined relative position between the first device 110 and the first vehicle 102, and at least one selection criterion. For example, the first information may correspond to at least one of a promotional notification associated with one or more business entities within a threshold distance from the first vehicle 102 based on the determined relative position. In an example, the threshold distance may be radius of a few meters (such as 50-70 meters) from the first vehicle 102. The first information may further correspond to a notification associated with the tourist landmark within the threshold distance from the first vehicle 102, a notification related to an emergency within the threshold distance from the first vehicle 102, a broadcast related to traffic data around the first vehicle 102, or information of media content being played in the second vehicle within the threshold distance from the first vehicle 102.

In some embodiments, the selection criterion may be based on at least one of a user preference associated with a first occupant of the first vehicle 102 for a specific type of the first information, user preference history associated with the first occupant, a set priority of a business entity associated with the first device 110 among a plurality of business entities close to the geo-location of the first vehicle 102, trending information, or an emergency broadcast. Details of the receipt of the first information are further described for example, in FIG. 4A.

Figure 6:
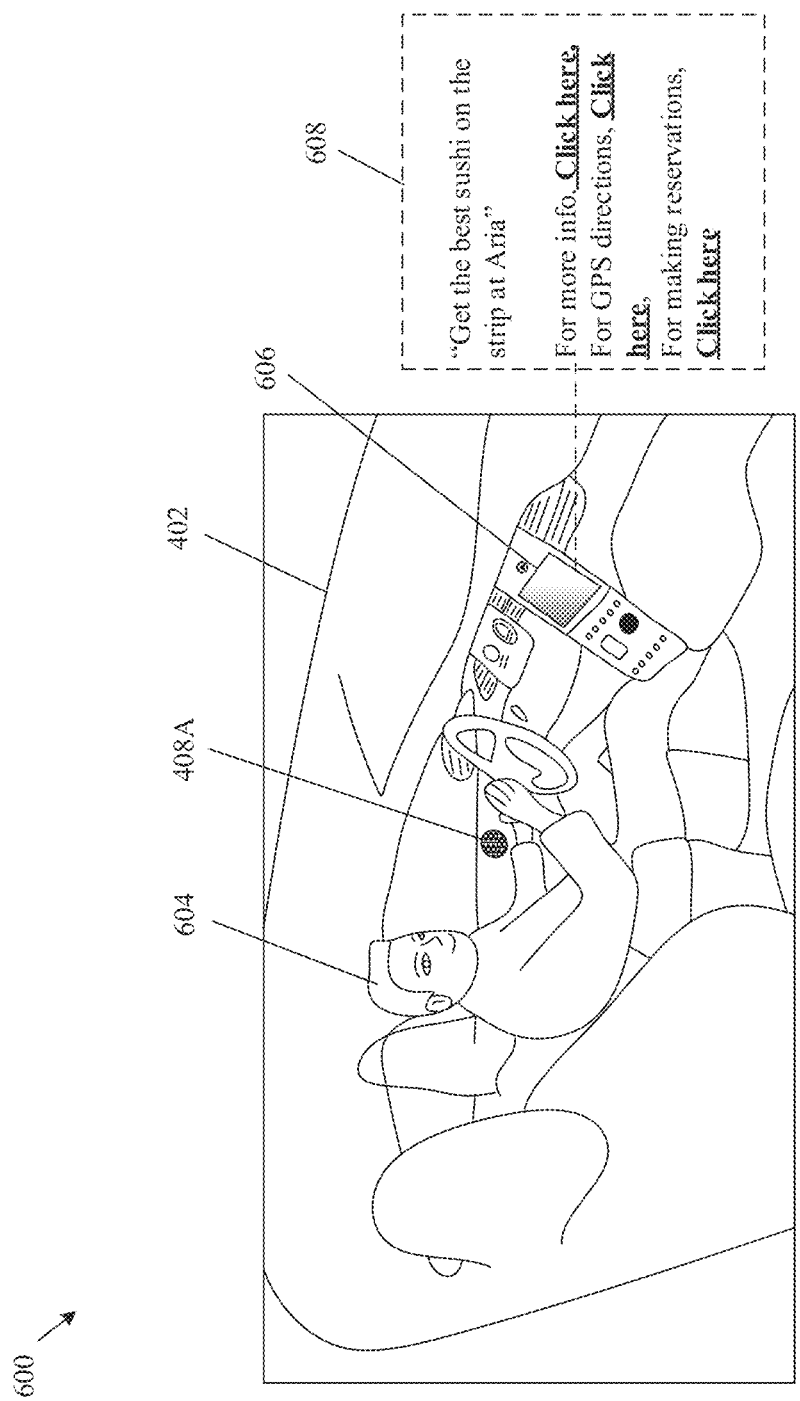
FIG. 6 is a diagram that illustrates an exemplary scenario for display of metadata associated with first information, in accordance with an embodiment of the disclosure.
Figure 7:
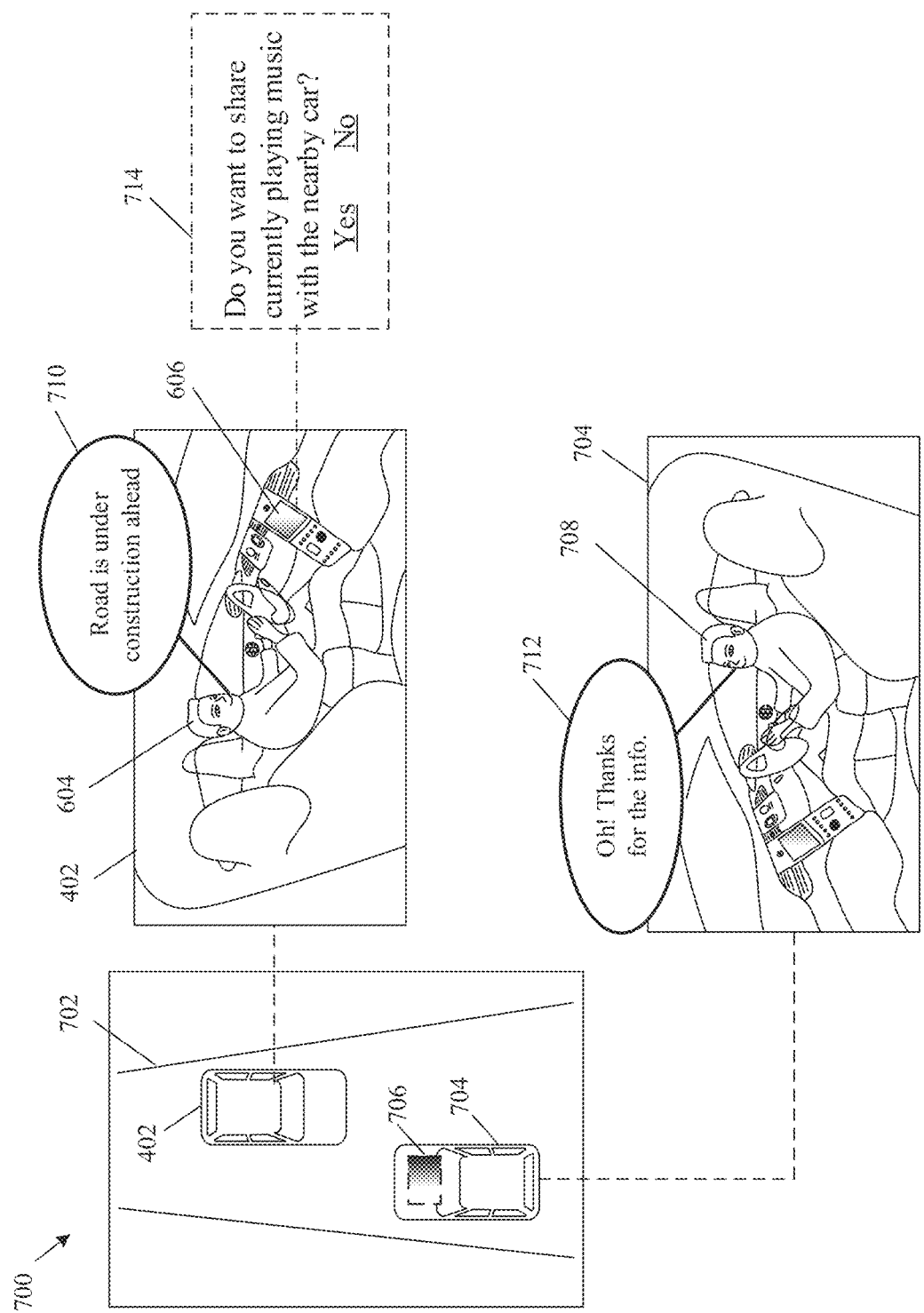
FIG. 7 is a diagram that illustrates an exemplary scenario for exchange of voice messages and information related to media content between the first vehicle and a second vehicle, in accordance with an embodiment of the disclosure.

The control system 104 may further generate the first 3D audio object corresponding to the received first information. For example, the first 3D audio object may be a sound alert or a verbal notification. In an embodiment, the control system 104 may generate a textual notification corresponding to the first information, which may be output on a display device (as shown in FIGS. 6 and 7) associated with the first vehicle 102 or the user terminal 112 associated with the first occupant of the first vehicle 102. Details of the generation of the first 3D audio object are further described for example, in FIG. 4A.

The control system 104 may further control, based on the determined relative position, a first set of audio output devices of the plurality of audio output devices 108 to output the generated first 3D audio object, in a 3D space (as shown in FIG. 3) of the first vehicle 102 at a first time instant. The first 3D audio object may include multiple audio parameters (such as, depth based on volume, direction, channel information, parameters related to HRTF, a type of sound, etc.) for reproduction of the first 3D audio object in the 3D space of the first vehicle 102. The first 3D audio object may further include the content of the verbal notification (such as the name of the business entity, distance to the business entity, or a direction on which the business entity is located, promotional offer from the business entity, etc.) along with the audio parameters for the reproduction of the first 3D audio object. The plurality of audio output devices 108 may be positioned at different positions in the first vehicle 102, as depicted in FIG. 3. Details of the control of the first set of audio output devices are further described for example, in FIG. 4A. In some embodiments, the functionalities of the control system 104 may be performed by the user terminal 112 associated with the first occupant of the first vehicle 102, without departing from the scope of the present disclosure.

In one or more embodiments, the control system 104 may be configured to receive user input from the first occupant of the first vehicle 102 via the user terminal 112. The user input may correspond to a user preference of the first occupant for a type of the first information (e.g. choice of cuisine) from the first device 110. Based on the user input, the control system 104 may receive the first information from the first device 110 associated with a business entity (such as a nearby popular restaurant serving the cuisine of choice) when the first vehicle 102 is on the road. Details of the reception of the user input are further described for example, in FIG. 4A.

In accordance with an embodiment, the control system 104 may be further configured to receive second information from a second device associated with, for example, a business entity or a second vehicle. The control system 104 may generate a second 3D audio object corresponding to the second information. The control system 104 may further control a second set of audio output devices of the plurality of audio output devices 108 to output the generated second 3D audio object. In some embodiments, the generated second 3D audio object may be output as a virtual sound source. The control system 104 may further sequentially output the first 3D audio object at the first time instant and the second 3D audio object at a second time instant, based on a time synchronization between the first 3D audio object and the second 3D audio object. The control system 104 may be configured to execute the time synchronization based on the relative position of each of the first device 110 and the second device with respect to the first vehicle 102, or a priority of a business entity associated with each of the first device 110 and the second device at the geo-location of the first vehicle 102. Details of the time synchronization and the sequential output of the first 3D audio object and the second 3D audio object are further described for example, in FIGS. 4B and 4C. In one or more embodiments, the control system 104 may concurrently output the first 3D audio object and the second 3D audio object at different depths within the 3D space. Details of the concurrent output of the first 3D audio object and the second 3D audio object are further described for example, in FIG. 4D.

In one or more embodiments, the control system 104 may be configured to switch from the first set of audio output devices to a second set of audio output devices of plurality of audio output devices 108 to continuously change a position and volume of the virtual sound source in the 3D space, thereby providing a 3D audio experience inside the first vehicle 102. The position and the volume of the virtual sound source is changed based on a change in the position of the first device 110 (e.g. associated with the second vehicle) with respect to the first vehicle 102. Details of the switching of the first set of audio output devices to the second set of audio output devices are further described for example, in FIGS. 5A and 5B.

In some embodiments, the control system 104 may be configured to control a display device (as show in FIG. 6) to display recommendation information for reception of the first information. The recommendation information may be based on stored preference history of the first occupant of the first vehicle 102 for the reception of the first information, a recommendation from a third-party application subscribed by the first occupant, or a recommendation from a user of the third-party application different from the first occupant. The recommendation information may enable the first occupant to obtain recommendations of, for example, business entities, such as restaurants, movie theatres, or stores, from which the first occupant may obtain the first information. Details of the display of the recommendation information are further described for example, in FIG. 6.

In accordance with an embodiment, the first device 110 may be associated with a second vehicle. The control system 104 may control exchange of voice messages between the first occupant of the first vehicle 102 and a second occupant of the second vehicle. The control system 104 may further control exchange of media content (such as currently playing music) between the first vehicle 102 and the second vehicle. Details of the exchange of the voice messages and the media content are further described for example, in FIG. 7.

In some embodiments, the control system 104 may be configured to control an audio parameter (such as, volume, direction, channel information, parameters related to HRTF, etc.) of the first set of audio output devices related to a currently playing audio, based on reproduction timing information of the first 3D audio object corresponding to the received first information (such as media content being played in the second vehicle). For example, the reproduction timing information indicates start timing and end timing of the output of the first 3D audio object.

In some embodiments, the control system 104 may be configured to extract metadata associated with the received first information. For example, the metadata may comprise navigation information associated with a business entity within a threshold distance from the first vehicle 102, navigation information associated with a tourist landmark within the threshold distance from the first vehicle 102, a uniform resource locator (URL) to access a web page related to the first information, or contact information of a second occupant of a second vehicle within the threshold distance from the first vehicle 102. The control system 104 may be further configured to control a display device associated with one of the first vehicle 102 or a user terminal 112 to display the extracted metadata. The user terminal 112 may be associated with the occupant of the first vehicle 102. Details of the extraction of the metadata and the display of the metadata are further described for example, in FIG. 6.

Thus, the control system 104 of the present disclosure may provide assistance (such as via the recommendation information) to the first occupant and provide useful and relevant information (such as the first information) to the first occupant of the vehicle, which enables the first occupant of the first vehicle 102 to aurally and intuitively recognize positions of various establishments (such as restaurants, stores, theaters, etc.) and obtain useful information from surroundings while riding the first vehicle 102. Furthermore, the system may provide a fun and an interactive way of 3D audio interaction (such as via exchange of the voice messages and the media content) by utilizing the plurality of audio output devices to output the first 3D object for the first occupant of the first vehicle 102.

Figure 2:
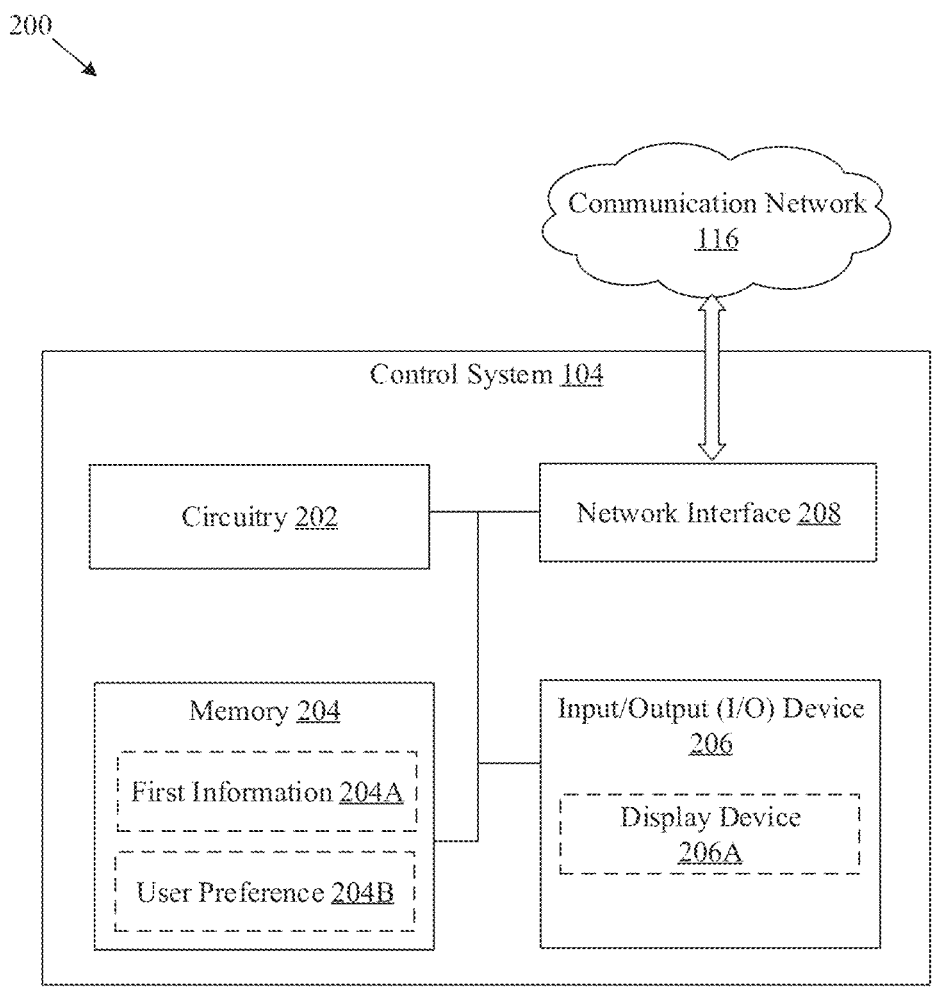
FIG. 2 is a block diagram that illustrates an exemplary control system for 3D audio interaction for the first vehicle, in accordance with an embodiment of the disclosure.

FIG. 2 is a block diagram that illustrates an exemplary control system for 3D audio interaction for the first vehicle, in accordance with an embodiment of the disclosure. FIG. 2 is explained in conjunction with elements from FIG. 1. With reference to FIG. 2, there is shown a block diagram 200 of the control system 104. The control system 104 may include circuitry 202, a memory 204, an Input/Output (I/O) device 206, and a network interface 208. The circuitry 202 may be communicatively coupled to the memory 204, the I/O device 206, and the network interface 208. In some embodiments, the memory 204 may include first information 204A and user preference 204B. The I/O device 206 may further include a display device 206A.

The circuitry 202 may include suitable logic, circuitry, and interfaces that may be configured to execute program instructions associated with different operations to be executed by the control system 104. For example, some of the operations may include determination of the relative position between the first device 110 and the first vehicle 102, and reception of the first information 204A from the first device 110 based on the determined relative position and at least one selection criterion. The circuitry 202 may be further configured to generate the first 3D audio object corresponding to the received first information 204A, and control the first set of audio output devices of the plurality of audio output devices 108 to output the generated first 3D audio object, in the 3D space of the first vehicle 102 at a first time instant. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the one or more instructions to be executed by the circuitry 202. The memory 204 may be configured to the first information 204A and user preference 204B. The user preference 204B may be received from the server 114, which may aggregate user preferences from different sources (such as social networking websites subscribed by the first occupant of the first vehicle 102). The memory 204 may be further configured to store a variety of data received from the server 114 via the network interface 208. The data received from the server 114 may include traffic data in a travel route of the first vehicle 102, user account data associated with the first occupant of the first vehicle 102, system updates for the control system 104, object identification learning data, navigation information, aggregated information related to multiple places of interest, attractions, restaurants, theaters, and so on. The memory 204 may be further configured to store the plurality of signals received from the plurality of sensors 106, the user input received from the first occupant of the first vehicle 102, the metadata associated with the first information 204A and the recommendation information for reception of the first information 204A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The first information 204A may correspond to at least one of a promotional notification associated with one or more business entities within a threshold distance from the first vehicle 102, a notification associated with a tourist landmark within the threshold distance from the first vehicle 102, a notification related to an emergency within the threshold distance from the first vehicle 102, a broadcast related to traffic data around the first vehicle 102, or information of media content being played in a second vehicle within the threshold distance from the first vehicle 102.

The user preference 204B may include user preferences aggregated from different sources (such as social networking websites subscribed by the first occupant of the first vehicle 102). In another example, the user preference 204B may include user input received from a user, such as a first occupant of the first vehicle 102. The user input may correspond to a user preference of the first occupant for a type of the first information from the first device 110. The user preference 204B may further include user preference history associated with the first occupant of the first vehicle 102. In some embodiments, the user input may be received from the first occupant via the user terminal 112.

The I/O device 206 may include suitable logic, circuitry, and interfaces that may be configured to receive a user input from the first occupant (such as the driver of the first vehicle 102) and provide an output based on the received input. The user input may correspond to user preference 204B for a type of the first information 204A from the first device 110. The output may correspond to the recommendation information for reception of the first information 204A. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The display device 206A may include suitable logic, circuitry, and interfaces that may be configured to receive the user input and display the recommendation information for reception of the first information 204A. In one or more embodiments, the display device 206A may be integrated with the native electronic control unit (ECU) (not shown) of the first vehicle 102 or the user terminal 112. The display device 206A may be a touch screen which may enable the first occupant to provide the user input via the display device 206A. The touch screen may be at least one of a resistive touch screen, a capacitive touch screen, or a thermal touch screen. The display device 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 206A may refer to a display screen of a head mounted device (HMD), a smart-glass device, a see-through display, a projection-based display, an electro-chromic display, or a transparent display.

The network interface 208 may include suitable logic, circuitry, and interfaces that may be configured to facilitate communication between the control system 104 of the first vehicle 102, the first device 110, the user terminal 112 and the server 114. The network interface 208 may be further configured to facilitate communication between the control system 104 and the native ECU (not shown) of the first vehicle 102 to receive various data related to the operation of the first vehicle 102, such as, activation of the indicator lights, rotational angle of the steering wheel, a speed of the first vehicle 102, a position of the gearshift, etc.). The network interface 208 may be implemented by use of various known technologies to support wired or wireless communication of the control system 104 with the communication network 116. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, a radio-frequency identification (RFID) tag, a Bluetooth® transceiver, or a local buffer circuitry. The network interface 208 may be configured to communicate via wireless communication with networks, such as the Internet, an Intranet or a wireless network, such as a cellular telephone network, a wireless local area network (LAN), a metropolitan area network (MAN), and a satellite communication network (such as a satellite constellation). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the control system 104, as described in FIG. 1, may be performed by the circuitry 202. Operations executed by the circuitry 202 are described in detail, for example, in FIGS. 3, 4A-4D, 5A-5B, 6 and 7.

FIG. 3 is an exemplary diagram that illustrates a configuration of a plurality of sensors and a plurality of audio output devices in the first vehicle, in accordance with an embodiment of the disclosure. FIG. 3 is described in conjunction with elements from FIGS. 1 and 2. With reference to FIG. 3, there is shown a first vehicle 300. The functions of the first vehicle 300 may be same as the functions of the first vehicle 102 described, for example, in FIG. 1. Therefore, the description of the first vehicle 300 is omitted from the disclosure for the sake of brevity.

The first vehicle 300 may include a plurality of sensors 302A-302D and a plurality of audio output devices 304A-304G. The first vehicle 300 may further include a 3D space 306. In accordance with an embodiment, the plurality of sensors 302A-302D may be positioned at different positions on the first vehicle 300. The plurality of sensors 302A-302D may include at least one of an image sensor, a light detection and ranging (LiDAR) sensor, an audio sensor, a radio detection and ranging (RADAR) sensor, a location sensor, an ultrasonic sensor, or a microphone. For example, a first sensor 302A of the plurality of sensors 302A-302D may be the RADAR sensor, which may be positioned towards, for example, a front end of the first vehicle 300. A second RADAR sensor may further be positioned towards a rear end of the first vehicle 300. The first sensor 302A may be utilized to detect objects, such as other vehicles surrounding the first vehicle 300. Thus, the first sensor 302A may be utilized for the determination of the relative position between the first device 110 and the first vehicle 102. In some embodiments, the first sensor may be a LiDAR sensor which may be positioned at the roof of the first vehicle 300. The LiDAR sensor may be configured to measure the distance of an object (such as a vehicle) from the first vehicle 300 by illuminating the object with light (e.g. laser light) and by measuring return times and wavelengths of the reflected light.

A second sensor 302B of the plurality of sensors 302A-302D may be the image sensor, which may be positioned at a front bumper, a rear bumper, a roof of the first vehicle 300. In some embodiments, one or more image sensors may further be positioned in an interior portion or at an exterior portion of the first vehicle 300. In another example, the second sensor 302B may be either a single wide field-of-view camera (such as a 360-degree camera or a spherical camera) or multiple wide field-of-view cameras mounted on the roof of the first vehicle 300. The wide field-of-view camera may capture a 360 degree image or a spherical image around the first vehicle 300 in X-axis, Y-axis and Z-axis directions, and thus concurrently capture multiple objects around the first vehicle 300. The second sensor 302B may be configured to generate one or more images based on the captured objects, such as, stationary objects (business entities, street signs, etc.) and moving objects (vehicles, pedestrians, etc.) around the first vehicle 300. In an embodiment, the image captured by the second sensor 302B may be subjected to image segmentation for detection and identification of the objects. A third sensor 302C of the plurality of sensors 302A-302D may be the location sensor, which may be integrated with the native electronic control unit (not shown) of the first vehicle 300, or may be a standalone sensor. The location sensor may be utilized to record a current geo-location of the first vehicle 300.

A fourth sensor 302D of the plurality of sensors 302A-302D may be the ultrasonic sensor or the microphone which may be positioned at the rear end of the first vehicle 300. For example, the fourth sensor 302D may be used to determine a distance between the rear end of the first vehicle 300 and the object, such as a second vehicle or a pile of boxes which may be located at a threshold distance from the first vehicle 300. Furthermore, the first vehicle 300 may include sensors, such as the audio sensors positioned at different positions in the first vehicle 300. It may be noted that positions of the plurality of sensors 302A-302D shown in FIG. 3 are merely illustrative of an example, and one or more of the plurality of sensors 302A-302D may be positioned at other positions on the first vehicle 102 (such as on rear-view mirrors, wing mirrors, or chassis of the first vehicle 102) based on performance requirement and other factors, without departing from scope of the disclosure.

The plurality of audio output devices 304A-304G may be positioned at different positions in the first vehicle 300. For example, a first audio output device 304A may be positioned at a front left side door of the first vehicle 300 or the left hand side of the dashboard of the first vehicle 300. A second audio output device 304B may be positioned at a rear left side door of the first vehicle 300. A third audio output device 304C may be positioned at a left side rear end of the first vehicle 300. A fourth audio output device 304D may be positioned at a right side rear end of the first vehicle 300. A fifth audio output device 304E may be positioned at a rear right side door of the first vehicle 300. A sixth audio output device 304F may be positioned at a front right side door of the first vehicle 300 or the right hand side of the dashboard of the first vehicle 300. A seventh audio output device 304G may be positioned at the interior portion of the roof of the first vehicle 300. In one or more embodiments, one or more audio output devices (not shown in FIG. 3) may be positioned at the interior portion of a bottom of the first vehicle 300. In another example, the plurality of audio output devices 304A-304G may be positioned in the seat of the first vehicle 300 or near the head of the occupant of the first vehicle 300, and may include a headrest speaker, a headrest actuator, or a helmet speaker. It may be noted that positions of the plurality of audio output devices 304A-304G shown in FIG. 3 are merely illustrative of an example, and one or more of the plurality of audio output devices 304A-304G may be positioned at other positions in the first vehicle 102 based on performance requirement and other factors, without departing from scope of the disclosure.

The control system 104 may be configured to control the plurality of audio output devices 304A-304G to output the first 3D audio object in the 3D space 306 of the first vehicle 300 at a first time instant. In some embodiments, the control system 104 may control a first set of audio output devices of the plurality of audio output devices 304A-304G to output the first 3D audio object, based on the determined relative position between the first device 110 and the first vehicle 102. The number of plurality of audio output devices 304A-304G shown in FIG. 3 is presented merely as an example. The plurality of audio output devices 304A-304G may include one audio output device or more than seven audio output devices for output of the 3D audio object, without deviating from the scope of the disclosure. For the sake of brevity, a limited number of audio output devices (the plurality of audio output devices 304A-304G) have been shown in FIG. 3. However, in some embodiments, the number of audio output devices may be more than seven, without limiting the scope of the disclosure.

Figure 4A:
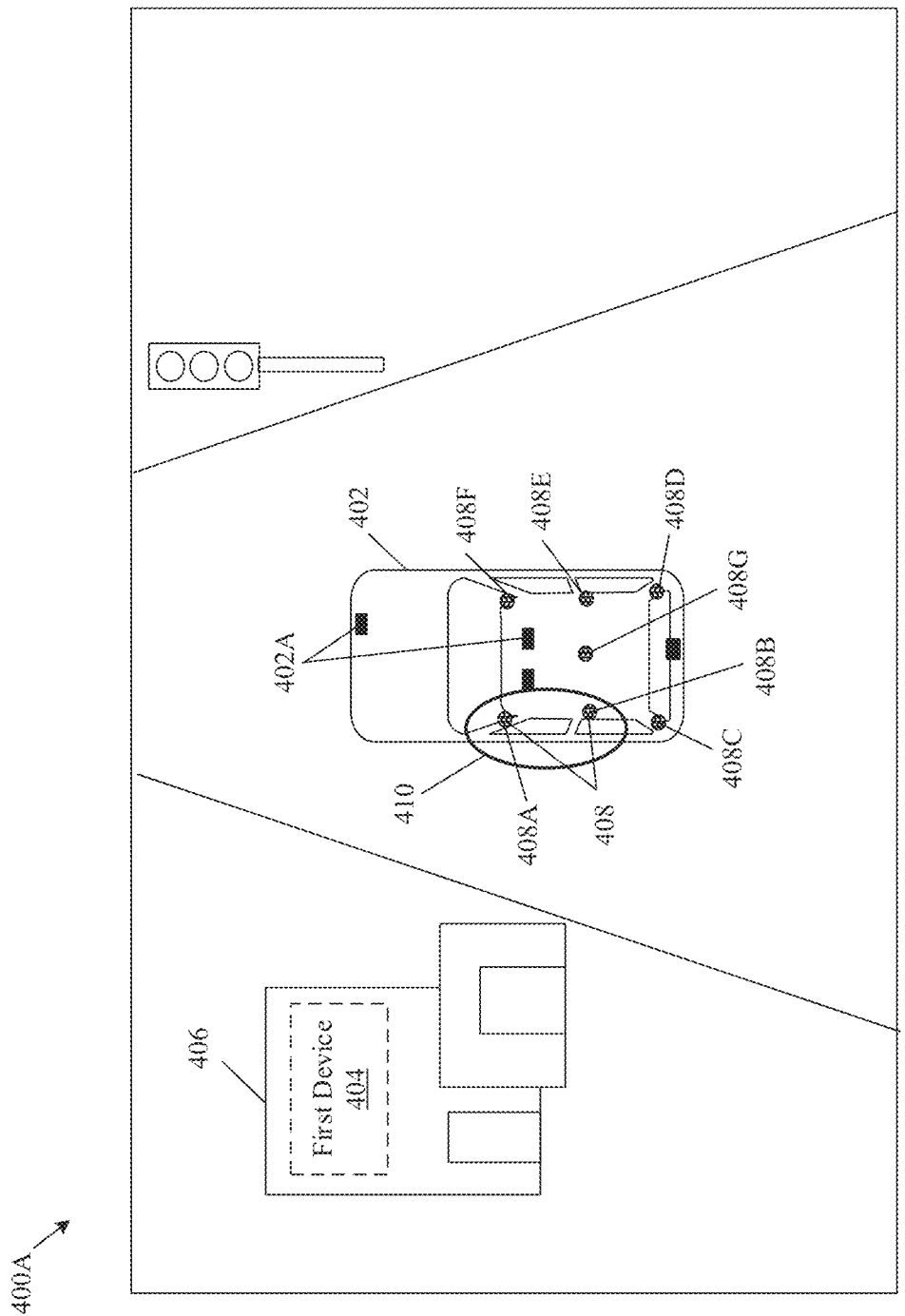
FIG. 4A is a diagram that illustrates an exemplary scenario for 3D audio interaction of the first vehicle and a first device, in accordance with an embodiment of the disclosure.

FIG. 4A is a diagram that illustrates an exemplary scenario for 3D audio interaction of the first vehicle and a first device, in accordance with an embodiment of the disclosure. FIG. 4A is described in conjunction with elements from FIGS. 1, 2, and 3. With reference to FIG. 4A, there is shown a scenario 400A. In the scenario 400A, there is shown a first vehicle 402 and a first device 404. The first device 404 may be associated with a first entity 406. The functionalities of the first vehicle 402 may be same as the functionalities of the first vehicle 102 described, for example, in FIG. 1. Moreover, the functionalities of the first device 404 may be same as the functionalities of the first device 110 described, for example, in FIG. 1. Therefore, the description of the first vehicle 402 and the first device 404 is omitted from the disclosure for the sake of brevity.

The first vehicle 402 may include a plurality of sensors 402A (such as the plurality of sensors 302A-302D shown in FIG. 3). The first vehicle 402 may further include a plurality of audio output devices 408A-408G (such as the plurality of audio output devices 304A-304G shown in FIG. 3). The first vehicle 402 may be driven by a first occupant. The plurality of sensors 402A may output a plurality of signals associated with surroundings (which may include the first entity 406) of the first vehicle 402 while the first vehicle 402 may be moving. In an exemplary embodiment, the first device 404 may be located inside the first entity 406. In alternate embodiments, the first device 404 may be located outside the first entity 406. In some embodiments, the first entity 406 may be the business entity, the traffic regulatory agency, the emergency regularity entity, or the tourist information center. In the scenario 400A, the first entity 406 may be the business entity (e.g. a theater, a casino, a resort, etc.).

The circuitry 202 may be configured to receive the plurality of signals from the plurality of sensors 402A (e.g. an image sensor). The circuitry 202 may further determine the relative position between the first device 404 (associated with the first entity 406) and the first vehicle 402 based on the received plurality of signals (e.g. a captured image of the first entity 406) and the geo-location of the first vehicle 402 and the known location of the first entity 406. For example, based on the combination of the captured image of the first entity 406, a position of the image sensor 402A that outputs the captured image, and the geo-location of the first vehicle 402, circuitry 202 may determine the relative position of the first device 404 with respect to the first vehicle 402 to be, for example, 20 meters on a left side of the first vehicle 402. The geo-location of the first vehicle 402 may include current geographical coordinates of the first vehicle 402.

In an embodiment, the circuitry 202 may transmit the geo-location of the first vehicle 402 to the server 114, which may be configured to match the geo-location of the first vehicle 402 with the known location of the first entity 406 and other business entities nearby. The server 114 may be configured to transmit, to the first device 404, information regarding the presence of the first vehicle 402 at the location of the first entity 406. Based on the information regarding the presence of the first vehicle 402 at the location of the first entity 406, the first device 404 may transmit the first information 204A to the first vehicle 402 via the server 114 over the communication network 116. In another embodiment, the circuitry 202 the first device 404 may broadcast the first information 204A or execute point-to-point communication with the first vehicle 401 to transmit the to the first vehicle 402. In another embodiment, the circuitry 202 may control the network interface 208 (as shown in FIG. 2) to initiate a communication with the first device 404 when the first device 404 is in a communication range of the network interface 208. Once the communication is established, the circuitry 202 may receive the first information 204A from the first device 404. In another embodiment, the first device 404 and the network interface 208 may be both equipped with radio-frequency identification (RFID) system. The first device 404 may be configured as an RFID reader and the network interface 208 may be equipped with an RFID tag. The RFID reader of the first device 404 may detect the presence of the first vehicle 402 when the first vehicle 402 (equipped with the RFID tag) approaches the RFID reader, and may trigger the first device 404 to execute communication of the first information 204A with the first vehicle 402 via the server 114.

The circuitry 202 may further receive the first information 204A from the first device 404 based on the determined relative position between the first device 404 and the first vehicle 402, and at least one selection criterion. The circuitry 202 may further receive first information 204A from the first device 404 via the network interface 208 (shown in FIG. 2). For example, the circuitry 202 may receive first information 204A from the first device 404 when the determined relative position between the first device 404 and the first vehicle 402 (based on the geo-location of the first vehicle 402) indicates that the first vehicle 402 is in a communication range (e.g. a few meters) of the first device 404. The determined relative position may indicate a proximity and a direction of the first device 404 with respect to the first vehicle 402. In accordance with an embodiment, the first device 404 may stream the first information 204A to the first vehicle 402 through the server 114, broadcast the first information 204A, or execute point-to-point communication of the first information 204A with the first vehicle 402, via the communication network 116 (shown in FIG. 1), when the first vehicle 402 is in the communication range (e.g. a few meters) of the first device 404.

In accordance with an embodiment, the first information 204A may correspond to a promotional notification associated with one or more business entities (such as the first entity 406) within a threshold distance from the first vehicle 402 based on the determined relative position. In an example, the threshold distance may be radius of a few meters (such as 50-70 meters) around the first vehicle 102. Based on the determination that the relative position of the first device 404 (or the first entity 406) with respect to the first vehicle 402 is within 70 meters on the left side of the first vehicle 402, the circuitry 202 may receive the first information 204A from the first device 404 of the first entity 406. The first information 204A may include the promotional notification associated with the first entity 406, such as "Gwen Stefani tickets are available for tonight at Planet Hollywood". The circuitry 202 may be further configured to generate, based on the determined relative position, a first 3D audio object 410 corresponding to the received first information 204A (such as the promotional notification associated with the first entity 406) within the 3D space of the first vehicle 402. Such notifications may be convenient and advantageous, and may inform the first occupant, on the move, of the proximity to and availability of tickets for places of interest near the first vehicle 402.

The first information 204A may further correspond to a notification associated with a tourist landmark within the threshold distance from the first vehicle 402. For example, the first entity 406 may be the tourist landmark, such as an art museum or a sports arena. The circuitry 202 may receive a notification, such as "The metropolitan museum of arts is located 50 meters on the left" from the first entity. Such notifications may be useful for the first occupant for locating nearby tourist landmarks as well for receiving information related to the tourist landmarks.

The first information 204A may further include a notification related to an emergency within the threshold distance from the first vehicle 402 or a broadcast related to traffic data around the first vehicle 402. For example, the first entity 406 may be a government server which may utilize the first device 404 to provide notifications related to emergencies such as detour, road blockage, and so forth. In another example, the first device 404 may be utilized to broadcast the traffic data, such as, "heavy congestion detected on Cheyenne Avenue".

The first information 204A may further correspond to information of media content being played in a second vehicle within the threshold distance from the first vehicle

402. Example of the first device 404 associated with the second vehicle are further described in FIGS. 5A, 5B and 7. The circuitry 202 may further control exchange voice messages and the media content being played in second vehicle (associated with the first device 404) as described in FIG. 7.

In some embodiments, the reception of the first information 204A may be based on the selection criterion. Table 1 shows an exemplary list of selection criterion in an example order of priority for the reception of the first information 204A from the first device 404. The order of priority may be set by the control system 104 as a default order, or may be set based on user input.

TABLE 1

Selection criterion for reception of first information

| Priority Order | Selection Criterion |
| --- | --- |
| 1 | User preference |
| 2 | User preference history |
| 3 | Set priority for a business entity |
| 4 | Closeness of business entities with first vehicle |
| 5 | Trending information |
| 6 | Traffic Update/Emergency broadcast |

As shown in Table 1, the selection criterion may be based on the user preference associated with the first occupant of the first vehicle 402 for a specific type of the first information 204A. For example, the user preference of the first occupant may be to receive the first information 204A related to clothing (e.g. party wear). In another example, the user preference of the first occupant may be to receive the first information 204A related to restaurant (Subway™), cuisine (e.g. Italian), or food item (sushi or burger).

The selection criterion may be further based on user preference history associated with the first occupant from previous trips. For example, the user preference history may include that the preference of the first occupant may be "ABC clothing store". The user preference history may further be extracted with an account of the first occupant with a social networking website. The selection criterion may further be based on a set priority of a business entity (such as the first entity 406) associated with the first device 404 among a plurality of business entities close to the geo-location of the first vehicle 402, trending information (e.g. popularity of a restaurant on the social networking website subscribed by the first occupant), or an emergency broadcast. Table 2 shows an exemplary list of parameters based on which a priority of a business entity may be set or predefined.

TABLE 2

Parameters for setting priority of business entities

| S. No. | Parameters for setting priority of business entities | Weight |
| --- | --- | --- |
| 1. | Bidding amount/fee paid by each business entity | 40% |
| 2. | User preference history of first occupant | 10% |
| 3. | User preference for a current trip | 30% |
| 4. | Popularity/trend | 10% |
| 5. | Upcoming festivals | 5% |
| 6. | Seasonal requirements | 5% |

As shown in Table 2, the circuitry 202 may prioritize a first business entity among multiple business entities at the geo-location of the first vehicle 402, when an amount of fee paid by the first business entity is more than an amount of fee paid by the other business entities for broadcast of notifications as the first information 204A. In an embodiment, the priority of the business entity may determine which notification among multiple notifications associated with multiple business entities is received first by the first vehicle 402 once the first vehicle enters a particular geo-location. For example, a store "ABC clothing store" and an "XYZ restaurant" may be co-located at a particular geo-location. In case "ABC clothing store" has paid more fee than the "XYZ restaurant", the first vehicle 402 may receive the first information 204A from the "ABC clothing store" followed by the first information 204A from the "XYZ restaurant". In another example, a store that sells winter jackets may be given a higher priority than a store that sells hiking gear, in the month of December. In another example, a store that sells Christmas decorations may be given a higher priority in the month of December than a store that sells air conditioners. In another example, a higher priority may be given to a business entity, such as a specific eating joint which may be generally preferred by the first occupant on the evening trips, based on the user preference history. In an embodiment, the circuitry 202 may be configured to assign priority to each business entity at the particular geo-location based on a weighted sum of each of the parameters as shown in table 2. In case the first occupant has not set any preference for the current trip, the weights for other parameters may be increased to calculate the priority of each business entity (e.g. user preference history and popularity/trend may be assigned 25% weightage each).

In accordance with an embodiment, the circuitry 202 may be configured to receive a user input from the user terminal 112 of the first occupant of the first vehicle 402. The user input may correspond to the user preference for the type of the first information 204A from the first device 404. The user preference may be used for the selection criterion as depicted in Table 1.

In some embodiments, the circuitry 202 may be configured to generate recommendation information for the reception of the first information 204A. The recommendation information may be based on a stored preference history of the first occupant for the reception of the first information 204A, a recommendation from a third-party application (e.g. social networking application, music application, etc.) subscribed by the first occupant, or a recommendation from a user of the third-party application different from the first occupant. Table 3 shows an exemplary list of the recommendation information for the reception of the first information 204A.

Table 3

Recommendation information

| S. No. | Recommendation information | Source | User input (Yes/No) |
| --- | --- | --- | --- |
| 1. | ABC Clothing store | Application A | Yes |
| 2. | XYZ Restaurant | Application B | No |
| 3. | PQR Movie theatre | Stored preference history | Yes |
| 4. | Emergency information broadcast | Emergency broadcast | Yes |
| 5. | Traffic Updates | Local traffic server | No |
| 6. | Music exchange with other vehicles | Music Application | Yes |

In accordance with an embodiment, the circuitry 202 may be configured to control a display device (such as the display device 206A) associated with one of the first vehicle 402 or the user terminal 112 to display the recommendation information (such as Table 3) for reception of the first information 204A. The user terminal 112 may be associated with the first occupant of the first vehicle 402. The recommendation information may be displayed on the user terminal 112 before a start of the trip by the first occupant, thereby enabling the first occupant to select the preferred sources of the first information 204A by user input.

As shown in Table 3, the recommendation information may include a specific store ("ABC clothing store" which may be on the route of the trip of the first occupant) from a third-party application registered by the first occupant. Similarly, the recommendation information may include specific business entities, such as an "XYZ restaurant" or a "PQR Movie theatre", based on either another third-party application or a stored user preference history of the first occupant. Further, the recommendation information may include the emergency broadcasts and the traffic updates. The recommendation from the third-party music application (such as Spotify™) subscribed by the first occupant, may be used to generate the recommendation information. Furthermore, the recommendation from a user (such as a friend of the first occupant) of the third-party application different from the first occupant may be used to generate the recommendation information.

In an embodiment, as shown in Table 3, the control system 104 may receive a user input from the first occupant ("Yes" or "No" input) for the sources of recommendation information for each trip. The first occupant may receive recommendations from third-party applications and other sources (such as the local traffic server) for which the first occupant may select "Yes" to receive the recommendation information. The first occupant may select "No" for the sources which are not preferred by the first occupant for the trip. The user input may be provided by the first occupant via the display device 206A associated with the user terminal 112. Therefore, the control system 104 may receive the user preference via the user terminal 112 associated with the first occupant. The control system 104 may further display the recommendation information, for reception of the first information 204A, for selection by the first occupant before the start of the trip.

The circuitry 202 may be further configured to generate a first 3D audio object 410 corresponding to the received first information 204A. The first 3D audio object 410 may include the first information 204A, such as a notification associated with the first entity 406. The circuitry 202 may further control, based on the determined relative position, a first set of audio output devices 408 of the plurality of audio output devices 408A-408G to output the generated first 3D audio object 410, in the 3D space 306 of the first vehicle 402 at a first time instant. The first set of audio output devices 408 may include a first audio output device 408A and a second audio output device 408B. As shown in FIG. 4A, when the relative position of the first device 404 of the first entity 406 with respect to the first vehicle 402 is on the left side of the first vehicle 402, the circuitry 202 may control the first set of audio output devices 408, which may be present on the left side of the first vehicle 402, to output the first 3D audio object 410. It may be noted that the oval that depicts the first 3D audio object 410 in FIG. 4A is a symbolic representation of the first 3D audio object 410 output by one or more of the plurality of audio output devices 408A-408G.

In another embodiment, the circuitry 202 may be configured to generate an identifier of the selected first set of audio output devices 408 of the plurality of audio output devices 408A-408G from which first 3D audio object 410 is to be reproduced. The circuitry 202 may be configured to select the first set of audio output devices 408 based on the position of the first entity 406 with respect to the first occupant of the first vehicle 402. The circuitry 202 may be configured to extract the received first information 204A and the identifier of the first set of audio output devices 408, and reproduce the first 3D audio object 410 in audio form via the first set of audio output devices 408.

In some embodiments, the circuitry 202 may be configured to control the first set of audio output devices 408 to output the first 3D audio object 410 as a virtual sound source. The 3D space 306 may include at least one of an interior space of the first vehicle 402, a space between the first vehicle 402 and the first entity 406, or both. The circuitry 202 may further control the position of the virtual sound source to correspond to one of an interior space of the first vehicle 402 or the space between the first vehicle 402 and the first entity 406. The position and the volume of the virtual sound may be changed based on a change in the relative position of the first device 404 with respect to the first vehicle 402. The first 3D audio object 410 may be output by the first set of audio output devices 408 in the 3D space 306 so as to allow the first occupant of the first vehicle 402 to intuitively and aurally recognize a proximity (e.g. in accordance to depth based on volume of the first 3D audio object 410) and a position (e.g. based on output direction of the first 3D audio object 410) of the first entity 406, which may enable the first occupant to perform actions such as navigating or parking the first vehicle 402.

For example, the circuitry 202 may further control the first set of audio output devices 408 using, for example, HRTF, such that the virtual sound source appears to be located at a position that is midpoint between the actual positions of the first audio output device 408A and the second audio output device 408B. The circuitry 202 may employ HRTF (or other 3D sound localization techniques for sound reconstruction) to determine the energy of a signal for driving each of the first set of audio output devices 408, such that the resulting sound (e.g. first 3D audio object 410) output by the first set of audio output devices 408 is a 3D sound with directionality. In one embodiment, the origination position of the virtual sound source may be determined based on the relative positions of the first occupant of the first vehicle 402 and the first entity 406. In an embodiment, the HRTF may be determined for one or more HRTF filters associated with each of the first set of audio output devices 408. The circuitry 202 may be configured to determine one or more parameters associated with the one or more HRTF filters, based on a listening position of the first occupant of the first vehicle 402 and the positions of each of the first set of audio output devices 408 within the 3D space. The circuitry 202 may then control the application of the HRTF on the first set of audio output devices 408 based on the determined one or more parameters to control reproduction of the first 3D audio object 410. The circuitry 202 may further control different sound parameters of the first set of audio output devices 408, such as, volume, direction, channel information, a type of sound (e.g. alert or verbal notification, etc.) of the first 3D audio object 410.

In accordance with an embodiment, the circuitry 202 may be further configured to control an audio parameter of the first set of audio output devices 408 of the plurality of audio output devices 408A-408G related to a currently playing audio. The audio parameter may be controlled based on reproduction timing information of the first 3D audio object 410 corresponding to the received first information 204A. The reproduction timing information may indicate start timing and end timing of the output of the first 3D audio object 410. For example, the first set of audio output devices 408 may be controlled to play an audio, such as a music track. The circuitry 202 may control the first set of audio output devices 408 to gradually reduce the volume of the currently playing audio, such that the first 3D audio object 410 may be clearly audible to the first occupant of the first vehicle 402. The circuitry 202 may further control the first set of audio output devices 408 to gradually increase the volume of the currently playing audio, in case the output of the first 3D audio object 410 is completed. Therefore, the control of the volume of the currently playing audio by the circuitry 202 may alert the first occupant to the presence of the approaching first entity 406, without significantly interrupting the playback of the currently playing audio in the first vehicle 402. It may be noted that the control of the volume of the currently playing audio, is merely an example, and the circuitry 202 may control other audio parameters (such as, frequency, equalization, direction, tone, etc.) of the currently playing audio output by the first set of audio output devices 408 based on the reproduction timing of the first 3D audio object 410, without departing from scope of the disclosure.

Figure 4B:
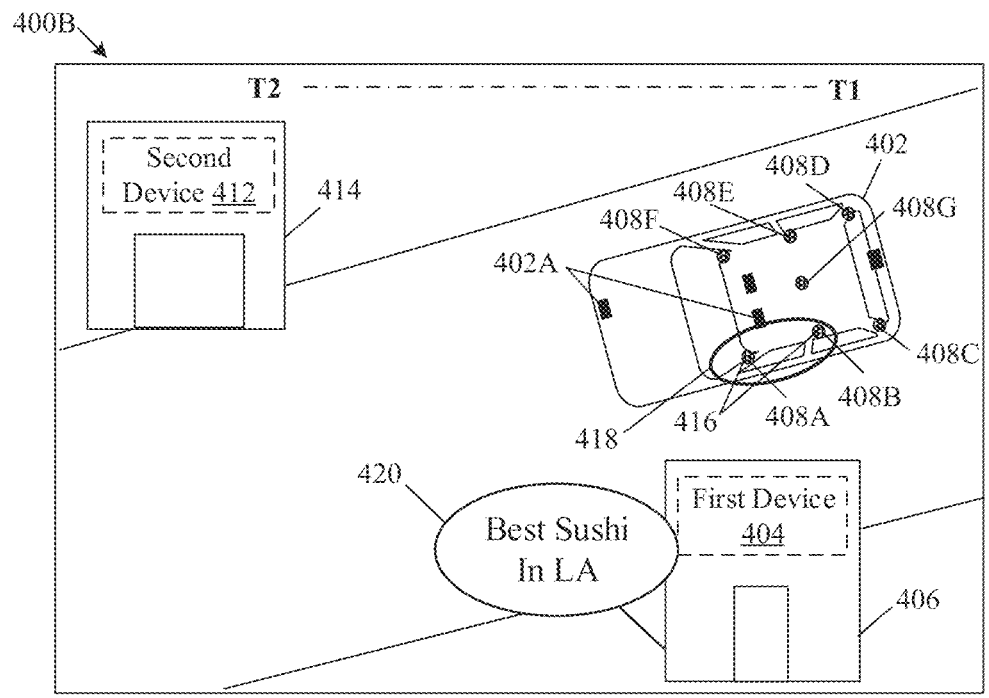
FIG. 4B is a diagram that illustrates an exemplary scenario for time synchronization of the 3D audio interaction of the first vehicle with a first device and a second device, in accordance with an embodiment of the disclosure.

FIG. 4B is a diagram that illustrates an exemplary scenario for time synchronization of the 3D audio interaction of the first vehicle with a first device and a second device, in accordance with an embodiment of the disclosure. FIG. 4B is described in conjunction with elements from FIGS. 1, 2, 3, and 4A. With reference to FIG. 4B, there is shown a scenario 400B. In the scenario 400B, there is shown the first vehicle 402, the first device 404, and the first entity 406. In the scenario 400B, there is further shown a second entity 414 and a second device 412 associated with the second entity 414.

In accordance with an embodiment, the first vehicle 402 may be present near the first device 404 associated with the first entity 406 at a first time instant T1. The circuitry 202 may receive the first information 204A, such as a first notification 420 (e.g. "Best sushi in LA") associated with the first entity 406. The circuitry 202 may generate a first 3D audio object 418 corresponding to the first notification 420. The circuitry 202 may further control a first set of audio output devices 416 to output the generated first 3D audio object 418 in the 3D space 306 of the first vehicle 402 at the first time instant T1. The first set of audio output devices 416 may correspond to a first audio output device 408A and a second audio output device 408B. The circuitry 202 may switch from the first set of audio output devices 416 to another set of audio output devices (such as the second audio output device 408B and a third audio output device 408C) to output the first 3D audio object 418 corresponding to the first notification 420 while the first vehicle 402 moves past the first entity 406, such that the first notification 420 (from the first entity 406) may appear to fade in and fade out within the 3D space 306 of the first vehicle 402.

Figure 4C:
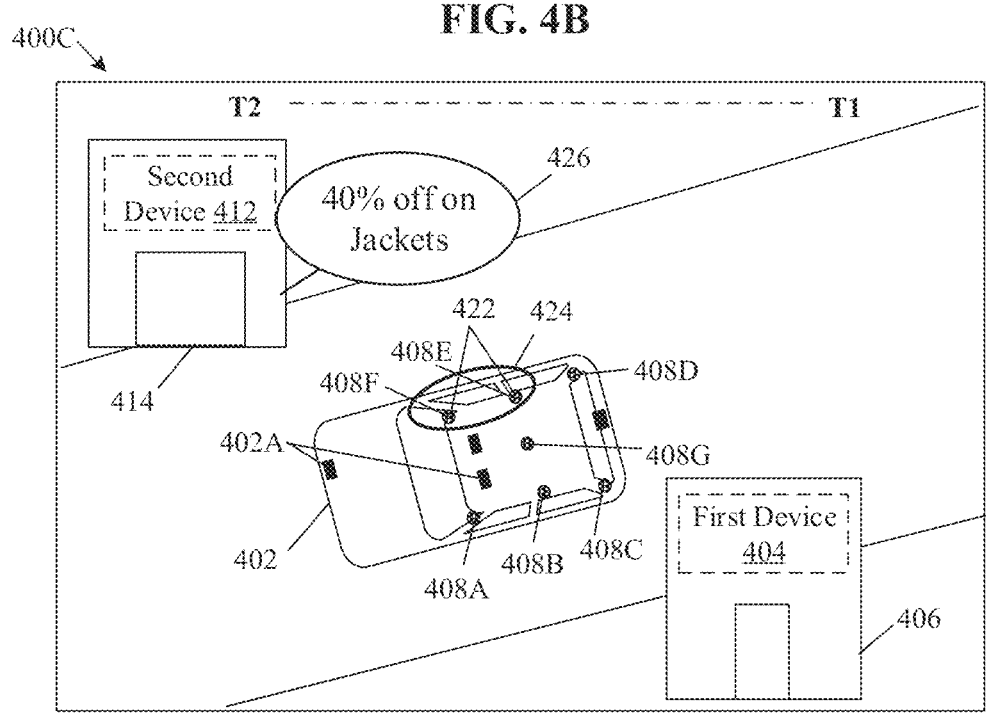
FIG. 4C is a diagram that illustrates an exemplary scenario for the time synchronization of the 3D audio interaction of the first vehicle with the first device and the second device, in accordance with an embodiment of the disclosure.

FIG. 4C is a diagram that illustrates an exemplary scenario for the time synchronization of the 3D audio interaction of the first vehicle with the first device and the second device, in accordance with an embodiment of the disclosure. FIG. 4C is described in conjunction with elements from FIGS. 1, 2, 3, 4A, and 4B. With reference to FIG. 4C, there is shown a scenario 400C. In the scenario 400C, the first vehicle 402 may be present near the second device 412 associated with the second entity 414 at a second time instant T2. In accordance with an embodiment, the circuitry 202 may receive second information, such as a second notification 426 (e.g. "40% off on Jackets) associated with the second entity 414, based on the relative position of the second device 412 with respect to the first vehicle 402. The circuitry 202 may further generate a second 3D audio object 424 corresponding to the second notification 426.

The circuitry 202 may further control a second set of audio output devices 422 to output the generated second 3D audio object 424 in the 3D space 306 of the first vehicle 402 at the second time instant T2. The time synchronization between the first 3D audio object 418 and the second 3D audio object 424 may allow the first occupant of the first vehicle 402 to clearly hear notifications related to each of the first entity 406 and of the second entity 414 one at a time. The second set of audio output devices 422 may correspond to a fifth audio output device 408E and a sixth audio output device 408F. The circuitry 202 may switch from the second set of audio output devices 422 to another set of audio output devices (such as the fifth audio output device 408E and a fourth audio output device 408D) to output the second 3D audio object 424 corresponding to the second notification 426 while the first vehicle 402 moves past the second entity 414, such that the second notification 426 (from the second entity 414) may appear to fade in and fade out within the 3D space 306 of the first vehicle 402.

In some embodiments, the circuitry 202 may be configured to control the plurality of audio output devices 408A-408G to sequentially output the first 3D audio object 418 at the first time instant T1 and the second 3D audio object 424 at the second time instant T2, based on a time synchronization between the first 3D audio object 418 and the second 3D audio object 424. For example, the first 3D audio object 418 may be output before the second 3D audio object 424 is output, since the first vehicle 402 may cross the first entity 406 before approaching the second entity 414.

In accordance with an embodiments, the circuitry 202 may execute synchronization between the first 3D audio object 418 and the second 3D audio object 424 based on the relative position of each of the first device 404 and the second device 412 with respect to the first vehicle 402. The circuitry 202 may further execute the synchronization between the first 3D audio object 418 and the second 3D audio object 424 based on the priority of a business entity (such as the first entity 406 and the second entity 414) associated with each of the first device 404 and the second device 412 among a plurality of business entities at the geo-location of the first vehicle 402. For example, the first 3D audio object 418 may be output before the output of the second 3D audio object 424, based on a higher priority assigned to the first entity 406 as compared to the second entity 414. On the other hand, the second 3D audio object 424 may be output before the output of the first 3D audio object 418, based on a higher priority assigned to the second entity 414 as compared to the first entity 406, even though the first vehicle 402 is closer to the first entity 406, as shown in FIG. 4B.

Figure 4D:
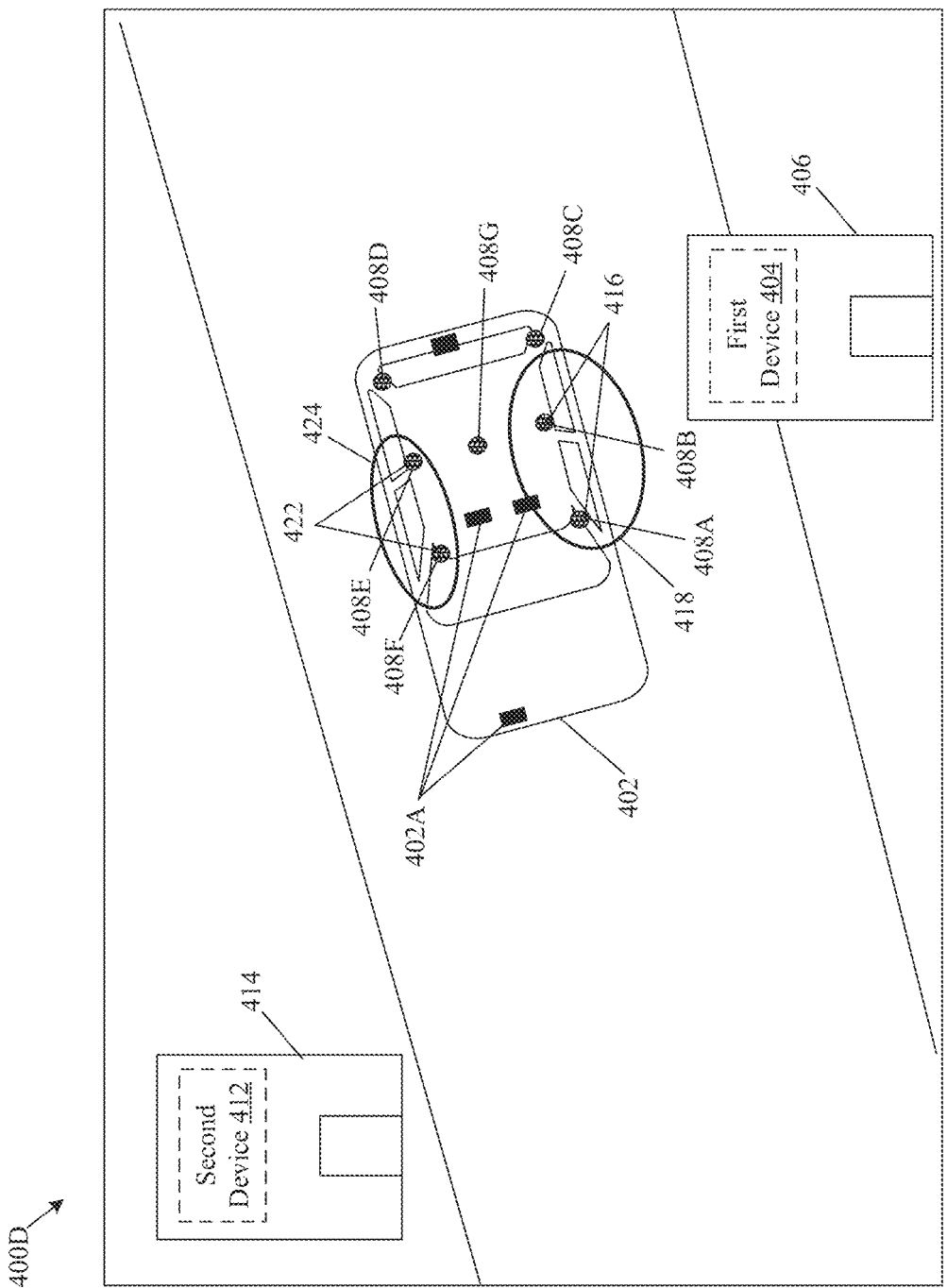
FIG. 4D is a diagram that illustrates an exemplary scenario for control of a plurality of audio output devices to concurrently output a first 3D audio object and a second 3D audio object, in accordance with an embodiment of the disclosure.

FIG. 4D is a diagram that illustrates an exemplary scenario for control of a plurality of audio output devices to concurrently output a first 3D audio object and a second 3D audio object, in accordance with an embodiment of the disclosure. FIG. 4D is described in conjunction with elements from FIGS. 1, 2, 3, 4A, 4B, and 4C. With reference to FIG. 4D, there is shown a scenario 400D.

In the scenario 400D, there is shown the first vehicle 402 near the first entity 406 which may be at a distance of 10 meters on the left side of the first vehicle 402. The second entity 414 may be present at the distance of 50 meters on the right side of the first vehicle 402. The circuitry 202 may be further configured to control the plurality of audio output devices to concurrently output the first 3D audio object 418 and the second 3D audio object 424 at different depths within the 3D space 306.

In an exemplary scenario, the circuitry 202 may control the first set of audio output devices 416 to output the first 3D audio object 418 at a higher volume as compared to a volume of the output of the second 3D audio object 424 by the second set of audio output devices 422 (as indicated by the different sizes of ovals representing the first 3D audio object 418 and second 3D audio object 424 in FIG. 4D). For example, the first 3D audio object 418 may be output at the higher volume based on the relative position of the first entity 406 with respect to the first vehicle 402. In another example, the first 3D audio object 418 may be output at the higher volume based on the higher priority assigned to the first entity 406.

The circuitry 202 may control the first set of audio output devices 416 and the second set of audio output devices 422, such that the first 3D audio object 418 and the second 3D audio object 424 may be rendered at a same time, at different depths (based on different volumes or other audio parameters), thereby enabling the first occupant to hear and distinguish both the first 3D audio object 418 and the second 3D audio object 424 concurrently.

Figure 5A:
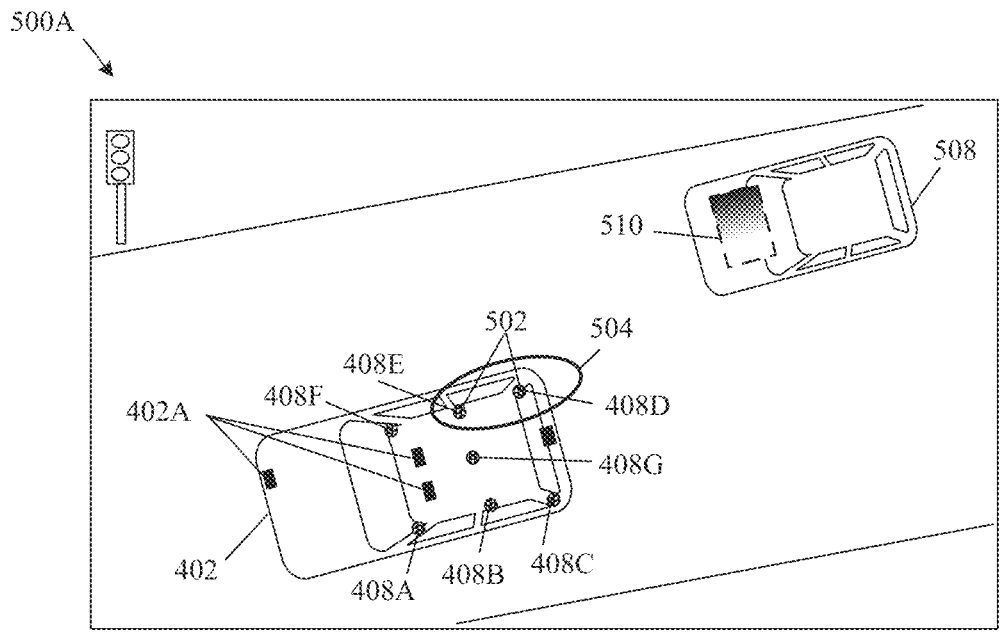
FIGS. 5A and 5B are diagrams that collectively illustrate exemplary scenarios for control of a plurality of audio output devices, based on change in position of a second vehicle with respect to the first vehicle, in accordance with an embodiment of the disclosure.
Figure 5B:
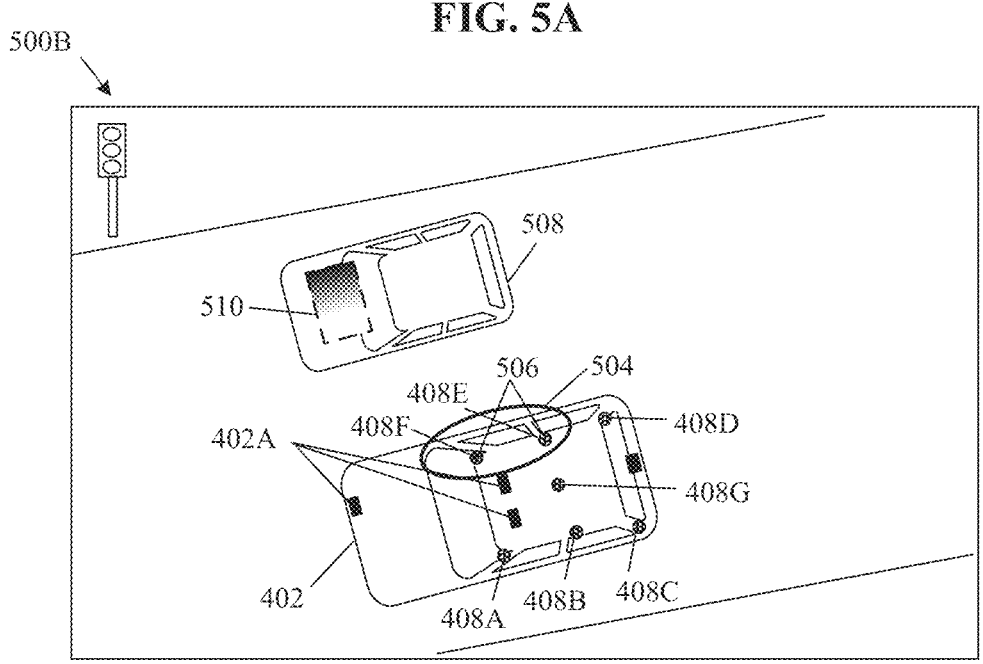

FIGS. 5A and 5B are diagrams that collectively illustrate exemplary scenarios for control of a plurality of audio output devices, based on change in position of a second vehicle with respect to the first vehicle, in accordance with an embodiment of the disclosure. FIGS. 5A and 5B are described in conjunction with elements from FIGS. 1, 2, 3, 4A, 4B, 4C and 4D. With reference to FIG. 5A, there is shown a scenario 500A.

In the scenario 500A, there is shown the first vehicle 402 and a second vehicle 508. In accordance with an embodiment, the second vehicle 508 may be associated with a first device 510. The circuitry 202 may be configured to detect a type of object (such as the second vehicle 508) and the position of the second vehicle 508 with respect to the first vehicle 402 based on the plurality of signals from the plurality of sensors 402A. In accordance with an embodiment, the detected type of the object may be a second vehicle (such as the second vehicle 508), a rumble strip, a street median, a pedestrian, or an obstacle. In an exemplary scenario, the circuitry 202 may employ image segmentation and object recognition techniques (using the object identification learning data stored in the memory 204) to detect the type of the object (such as the second vehicle 508) and the position of the second vehicle 508 with respect to the first vehicle 402 based on the received plurality of signals. In an example, the circuitry 202 may receive the plurality of signals corresponding to captured images of the surroundings of the first vehicle 402 including the second vehicle 508.

In an embodiment, the circuitry 202 may execute object detection techniques (using the object identification learning data stored in the memory 204) to detect the type of objects (such as second vehicle 508) included in the captured images. The circuitry 202 may be configured to acquire sample images for each type of object from the server 114, and store the sample images to detect the type of the object (such as the second vehicle 508). In some embodiments, the circuitry 202 may store a neural network model (not shown) which is trained using training data acquired from the server 114, to classify the object into different types (such as vehicle, pedestrian, tree, building, etc.). In another example, the circuitry 202 may be configured to determine the speed of the second vehicle 508 based on the capture of multiple images of the second vehicle 508 over a period of time. In case the first vehicle 402 is moving, the circuitry 202 may be configured to determine the speed of the second vehicle 508 based on the speed of the first vehicle 402. Based on the pixel information of the second vehicle 508 in the captured image, and a position of the image sensor 402A that outputs the captured image, the circuitry 202 may also determine the position and the distance of the second vehicle 508 with respect to the first vehicle 402.

In the scenario 400, the type of the detected object may be the second vehicle 508, such as a car which may be moving on the road. The circuitry 202 may transmit information related to first media content (e.g. a first music track) currently being played in the first vehicle 402 to the first device 510 of the second vehicle 508 when the second vehicle 508 is detected within a threshold distance with respect to the first vehicle 402. For example, the threshold distance may be radius of a few meters (such as 50-70 meters) from the first vehicle 102. In an embodiment, the circuitry 202 may control the network interface 208 (shown in FIG. 2) to transmit information related to first media content via the communication network 116 (as shown in FIG. 1). For example, the circuitry 202 may transmit information related to first media content via a short distance radio wave signal (for example, Bluetooth®). The circuitry 202 may further receive information, related to second media content (e.g. a second music track) being played in the second vehicle 508, from the first device 510 of the second vehicle 508 via the communication network 116 (shown in FIG. 1). The information related to the second media content may correspond to the first information 204A. In an embodiment, the information related to the second media content may include a portion of the second music track (e.g. an audio file). In an embodiment, the circuitry 202 may control the network interface 208 (as shown in FIG. 2) to initiate a communication with the first device 510 of the second vehicle 508 when the first device 510 is in a communication range of the network interface 208. Once the communication is established, the circuitry 202 and the first device 510 may exchange information (such as the first information 204A) with each other. Therefore, the circuitry 202 may enable exchange of the media content between the first vehicle 402 and the second vehicle 508.

In some embodiments, the circuitry 202 may control the first set of audio output devices 502 to output a first 3D audio object 504 corresponding to the second media content (e.g. a second music track) as a virtual sound source in the 3D space 306 of the first vehicle 402. The first set of audio output devices 502 may correspond to the fourth audio output device 408D and the fifth audio output device 408E, based on the relative position of the first vehicle 402 and the second vehicle 508.

With reference to FIG. 5B, there is shown a scenario 500B. The circuitry 202 may be configured to switch from the first set of audio output devices 502 to a second set of audio output devices 506 of the plurality of audio output devices 408A-408G to continuously change a position and volume of the virtual sound source corresponding to the first 3D audio object 504 in the 3D space 306 of the first vehicle 402, to provide a 3D audio experience inside the first vehicle 402. The second set of audio output devices 506 may correspond to the fifth audio output device 408E and the sixth audio output device 408F. As shown in FIGS. 5A and 5B, the circuitry 202 may change the position and the volume of the virtual sound source based on a change in the relative position of the second vehicle 508 with respect to the first vehicle 402, such that the second media content (being played in the second vehicle 508) may appear to fade in and fade out within the 3D space 306 of the first vehicle 402.

In an exemplary scenario, the first 3D audio object 504 may be output by the second set of audio output devices 506, when the position of the second vehicle 508 is changed from a first position (which may be right side rear end of the first vehicle 402) to a second position (which may be a right side near a front end of the first vehicle 402). In an example, the circuitry 202 may control the plurality of audio output devices 408A-408G such that the first 3D audio object 504 may be output sequentially by the fourth audio output device 408D, the fifth audio output device 408E and the sixth audio output device 408F, based on the changing position of the second vehicle 508 with respect of the first vehicle 402.

In accordance with an embodiment, the circuitry 202 may be further configured to enable or disable the transmission of the information, related to the first media content, to the first device 510 in the second vehicle 508. The transmission may be enabled or disabled based on a user input of the first occupant of the first vehicle 402. Details of the enabling or disabling the transmission of the information related to the first media content are further described for example, in FIG. 7.

In another embodiment, the type of the detected object may be the street median or a lane marking. In an example, the circuitry 202 may control the plurality of audio output devices 408A-408G to output an artificial rumble strip sound based on detection of the lane change by the first vehicle 402. The plurality of audio output devices 408A-408G may output the artificial rumble strip sound as a 3D sound that appears to emerge from the wheels of the first vehicle 402 on the side of the first vehicle 402 that drifts over the lane. The artificial rumble sound output by the set of audio output devices 408A-408G may simulate driving over an actual rumble strip to aurally alert the driver of the first vehicle 402 of the lane departure. In another embodiment, the circuitry 202 may output a verbal notification based on detection of the lane change by the first vehicle 402. In an example, the verbal notification may comprise a synthesized speech sound, such as, "please stay in your lane". Thus, the circuitry 202 may intuitively and aurally alert the driver of the first vehicle 402 that the first vehicle 402 may be departing to another lane or to the wrong side of the road.

FIG. 6 is a diagram that illustrates an exemplary scenario for display of metadata associated with first information, in accordance with an embodiment of the disclosure. FIG. 6 is described in conjunction with elements from FIGS. 1, 2, 3, 4A, 4B, 4C, 4D, 5A, and 5B. With reference to FIG. 6, there is shown a scenario 600. In the scenario 600, there is shown the first vehicle 402, a first occupant 604 of the first vehicle 402, and a display device 606 of the first vehicle 402.

In accordance with an embodiment, the circuitry 202 may be further configured to extract metadata 608 associated with the first information 204A received from the first device 404 or the second device 412 (associated with first entity 406 and the second entity 414 respectively in FIGS. 4B and 4C) or from the first device 510 (associated with the second vehicle 508 in FIGS. 5A and 5B). The metadata 608 may include navigation information associated with the first entity 406 (e.g. a business entity) within the threshold distance from the first vehicle 402 or navigation information associated with a second entity (e.g. a tourist landmark) within the threshold distance from the first vehicle 402. The metadata 608 may further include a uniform resource locator (URL) to access a web page related to the first information 204A, or contact information of a second occupant of the second vehicle 508 within the threshold distance from the first vehicle 402.

In some embodiments, the circuitry 202 may control the display device 606 associated with the first device 404 to display the extracted metadata 608. In case the first information 204A is received from a business entity, the metadata 608 may include, for example, information associated with a restaurant, such as "Get the best sushi on the strip at the Arie®". The metadata 608 may further include additional information (such as contact information, menu, or timings of the restaurant), which may be accessed through a URL displayed on the display device 606. The metadata 608 may further include navigation information (such as "for GPS direction, click here"), which may include a URL to navigate to the restaurant. The metadata 608 may further include a URL for making reservations at the restaurant. In case the first information 204A is received from the second vehicle 508, the metadata 608 may include contact information (email ID, phone number, or a social network profile) of the second occupant of the second vehicle 508. In one or more embodiments, the circuitry 202 may cause a display device associated with the user terminal 112 of the first occupant 604 to display the extracted metadata.

FIG. 7 is a diagram that illustrates an exemplary scenario for exchange of voice messages and information related to media content between the first vehicle and a second vehicle, in accordance with an embodiment of the disclosure. FIG. 7 is described in conjunction with elements from FIGS. 1, 2, 3, 4A, 4B, 4C, 4D, 5A, 5B, and 6. With reference to FIG. 7, there is shown a scenario 700. In the scenario 700, there is shown the first vehicle 402 and a second vehicle 704 on a street 702. In the scenario 700, there is further shown a first occupant 604 and a display device 606 associated with the first vehicle 402. In the scenario 700, there is further shown a first device 706 and a second occupant 708 associated with the second vehicle 704.

In accordance with an embodiment, the circuitry 202 may be configured to transmit a first voice message 710 spoken by the first occupant 604 of the first vehicle 402 to the first device 706 of the second vehicle 704 via the server 114 over the communication network 116 (as shown in FIG. 1). For example, the circuitry 202 may control the network interface 208 (shown in FIG. 2) to transmit the first voice message to the first device 706 of the second vehicle 704 via the server 114. In another example, the circuitry 202 may control the network interface 208 (shown in FIG. 2) to transmit the first voice message via a short distance radio wave signal. The second vehicle 704 may be within a threshold distance with respect to the first vehicle 402 based on the determined relative position. The first occupant 604 may inform the second occupant 708 of the second vehicle 704 about a hazard using the first voice message 710 (such as "road is under construction ahead"). The circuitry 202 may further transmit the first voice message 710 spoken by the first occupant 604 of the first vehicle 402 to other vehicles present in the threshold distance with respect to the first vehicle 402. In an embodiment, the first voice message 710 transmitted from the first vehicle 402 to the second vehicle 704 may include real-time or pre-recorded messages such as "Thank You", "Sorry", "After you", or any other courtesy messages that may de-escalate potential road rage. In certain scenarios, the circuitry 202 may detect an emergency situation associated with the first vehicle 402 based on information (such as airbags or emergency lights of the first vehicle 402 are activated) from the ECU of the first vehicle 402. In such a case, the first voice message 710 transmitted from the first vehicle 402 may include one or more automatic emergency broadcast messages to the second vehicle 704 and all surrounding vehicles, for example, when the circuitry 202 may detect that the airbags or emergency lights of the first vehicle 402 are activated. For example, automatic emergency broadcast messages may include messages such as "Help Needed" or "Emergency Ahead, Slow Down" to avoid multi-vehicle pileup during heavy fog or low visibility conditions.

The circuitry 202 may further receive, from the first device 706, a second voice message 712 spoken by the second occupant 708 of the second vehicle 704 via the server 114 over the communication network 116 (as shown in FIG. 1). The second voice message 712 may correspond to the first information 204A. In an example, the second voice message 712 may include response to the first voice message 710 of the first vehicle 402. For example, the second voice message 712 may be an acknowledgment (such as "Thank you for the information", "You're Welcome", or "It's Okay") of the first voice message 710. The circuitry 202 may further control a first set of audio output devices (such as audio output devices 408E and 408F) of the plurality of audio output devices 408A-408G to output the second voice message 712 within the 3D space 306 of the first vehicle 402. For example, the first set of audio output devices may be controlled based on the relative position of the second vehicle 704 with respect to the first vehicle 402. The first voice message 710 and the second voice message 712 may be related to other conversational exchanges, such, information about nearby parking spaces or gas stations, detours, or other hazards). Thus, control system 104 may allow respective occupants of the first vehicle 402 and the second vehicle 704 present in the threshold distance to interact with each other.

In accordance with an embodiment, the circuitry 202 may be configured to transmit information related to first media content (e.g. a first music track) currently being played in the first vehicle 402 to the first device 706 of the second vehicle 704 via the server 114 or by short-range radio communication. The second vehicle 704 may be within the threshold distance with respect to the first vehicle 402 based on the determined relative position. For example, the first media content may include a music track, or an audio podcast being played in the first vehicle 402. The information related to first media content may include the music track (e.g. an audio file) or a URL to access the music track.

In some embodiments, the circuitry 202 may be further configured to enable or disable the transmission of the information, related to the first media content, to the first device 706 of the second vehicle 704. The transmission may be enabled or disabled based on a user input of the first occupant 604 of the first vehicle 402. For example, the circuitry 202 may control the display device 606 to display a message 714, such as "Do you want to share currently playing music with the nearby car? Yes or No". The circuitry 202 may enable or the disable of the transmission of the information based on receipt of the user input from the first occupant 604. Thus, the circuitry 202 may transmit the information related to first media content (currently being played in the first vehicle 402) to the first device 706 of the second vehicle 704, based on the user input (e.g. selection of "Yes" on the display device 606). Furthermore, the circuitry 202 may disable the transmission of the information related to first media content based on the user input (e.g. selection of "No" on the display device 606), when the first occupant 604 prefers not to share the information related to first media content. Therefore, the circuitry 202 may allow the first occupant 604 to set preferences to maintain privacy of the information of the first media content.

The circuitry 202 may further be configured to receive information, related to a second media content being played in the second vehicle 704, from the first device 706 of the second vehicle 704. The information related to the second media content may correspond to the first information 204A. In some embodiments, the circuitry 202 may allow the first occupant 604 to accept or reject the first information 204A from the second vehicle 704, based on a user input of the first occupant 604. For example, the circuitry 202 may control the display device 606 to display a message such as "Do you wish to receive incoming media from a nearby vehicle? Yes or No". The first occupant 604 may select "Yes" or "No" to enable or disable receipt of the information related to second media content from the second vehicle 704.

The circuitry 202 may further be configured to control the first set of audio output devices (such as audio output devices 408E and 408F) to output the second media content within the 3D space 306 of the first vehicle 402. For example, the second vehicle 704 may be on a right side of the first vehicle 402. The circuitry 202 may control the first set of audio output devices (such as audio output devices 408E and 408F) which may be located on the right side of the first vehicle 402 such that the first occupant 604 may recognize the position of the source (e.g. second vehicle) of the incoming second media content.

Figure 8:
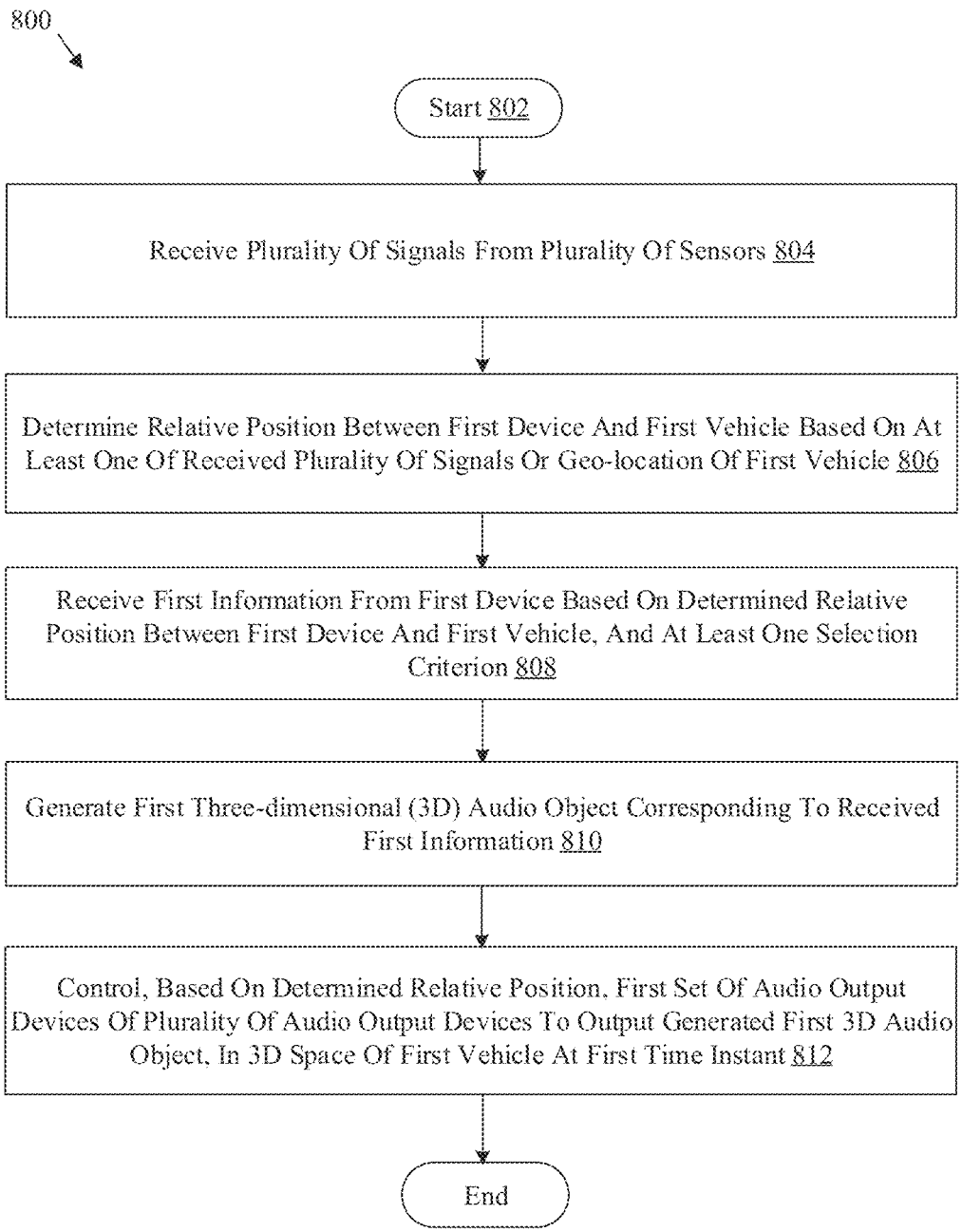
FIG. 8 is a flowchart that illustrates an exemplary method for 3D audio interaction for the first vehicle, in accordance with an embodiment of the disclosure.

FIG. 8 is a flowchart that illustrates an exemplary method for 3D audio interaction for the first vehicle, in accordance with an embodiment of the disclosure. FIG. 8 is explained in conjunction with elements from FIGS. 1, 2, 3, and 4A, 4B, 4C, 4D, 4E, 5A, 5B, 6 and 7. With reference to FIG. 8, there is shown a flowchart 800. The method illustrated in the flowchart 800 may be executed by any computing system, such as by the control system 104 or the circuitry 202. The method may start at 802 and proceed to 804.

At 804, the plurality of signals may be received from the plurality of sensors 106. In accordance with an embodiment, the circuitry 202 may be configured to receive the plurality of signals from the plurality of sensors 106. Details of the reception of the plurality of signals are provided, for example, in FIG. 3.

At 806, the relative position between the first device 404 and the first vehicle 402 may be determined based on at least one of the received plurality of signals or a geo-location of the first vehicle 402. In accordance with an embodiment, the circuitry 202 may be configured to determine the relative position between the first device 404 and the first vehicle 402 based on at least one of the received plurality of signals or a geo-location of the first vehicle 402. Details of the determination of the relative position are provided, for example, in FIG. 4A.

At 808, the first information 204A may be received from the first device 404 based on the determined relative position between the first device 404 and the first vehicle 402, and at least one selection criterion. In accordance with an embodiment, the circuitry 202 may be configured to receive the first information 204A from the first device 404 based on the determined relative position between the first device 404 and the first vehicle 402, and at least one selection criterion. Details of the reception of the first information 204A are provided, for example, in FIG. 4A.

At 810, the first 3D audio object 410 corresponding to the received first information 204A may be generated. In accordance with an embodiment, the circuitry 202 may be configured to generate the first 3D audio object 410 corresponding to the received first information 204A. Details of the generation of the first 3D audio object 410 are provided, for example, in FIG. 4A.

At 812, the first set of audio output devices 408 of the plurality of audio output devices 108 devices may be controlled, based on the determined relative position, to output the generated first 3D audio object 410, in the 3D space 306 of the first vehicle 402 at the first time instant. In accordance with an embodiment, the circuitry 202 may be configured to control the first set of audio output devices 408 of the plurality of audio output devices 108 devices, based on the determined relative position, to output the generated first 3D audio object 410, in the 3D space 306 of the first vehicle 402 at the first time instant. Details of the control of the first set of audio output devices 408 are provided, for example, in FIG. 4A.

Although the flowchart 800 is illustrated as discrete operations, such as 802, 804, 806, 808, 810 and 812, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a system (such as the control system 104). The instructions may cause the machine and/or computer to perform operations that may include receiving a plurality of signals from a plurality of sensors (such as the plurality of sensors 106). The operations may further include determining a relative position between a first device (such as the first device 110) and a first vehicle (such as the first vehicle 102) based on at least one of the received plurality of signals or a geo-location of the first vehicle 102. The operations may further include receiving first information (such as the first information 204A) from the first device 110 based on the determined relative position between the first device 110 and the first vehicle 102, and at least one selection criterion. The operations may further include generating a first three-dimensional (3D) audio object (such as the first 3D audio object 410) corresponding to the received first information 204A. The operations may further include controlling, based on the determined relative position, a first set of audio output devices (such as the first set of audio output devices 408) of the plurality of audio output devices 108 to output the generated first 3D audio object 410, in a 3D space (such as the 3D space 306) of the first vehicle 102 at a first time instant.

Exemplary aspects of the disclosure may provide a system (such as the control system 104 of FIG. 1) that includes a plurality of sensors (such as the plurality of sensors 106), a plurality of audio output devices (such as the plurality of audio output devices 108), and circuitry (such as the circuitry 202). The circuitry 202 may be configured to receive a plurality of signals from a plurality of sensors (such as the plurality of sensors 106). The circuitry 202 may be further configured determine a relative position between a first device (such as the first device 110) and a first vehicle (such as the first vehicle 102) based on at least one of the received plurality of signals or a geo-location of the first vehicle 102. The circuitry 202 may be further configured to receive first information (such as the first information 204A) from the first device 110 based on the determined relative position between the first device 110 and the first vehicle 102, and at least one selection criterion. The circuitry 202 may be further configured to generate a first three-dimensional (3D) audio object (such as the first 3D audio object 410) corresponding to the received first information 204A. The circuitry 202 may be further configured to control, based on the determined relative position, a first set of audio output devices (such as the first set of audio output devices 408) of the plurality of audio output devices 108 to output the generated first 3D audio object 410, in a 3D space (such as the 3D space 306) of the first vehicle 102 at a first time instant.

In accordance with an embodiment, the first device 110 may be associated with one of a business entity, a second vehicle, a traffic regulatory agency, an emergency regularity entity, or a tourist information center. The first device 110 may further stream the first information 204A to the first vehicle 102 through the server 114, broadcast the first information 204A, or execute point-to-point communication of the first information 204A with the first vehicle 102.

In accordance with an embodiment, the first information 204A may correspond to at least one of a promotional notification associated with one or more business entities within a threshold distance from the first vehicle 102 based on the determined relative position, a notification associated with a tourist landmark within the threshold distance from the first vehicle 102, a notification related to an emergency within the threshold distance from the first vehicle 102, a broadcast related to traffic data around the first vehicle 102, or information of media content being played in the second vehicle 704 within the threshold distance from the first vehicle 402.

In accordance with an embodiment, the at least one selection criterion is based on at least one of a user preference associated with the first occupant 604 of the first vehicle 402 for a specific type of the first information 204A, user preference history associated with the first occupant 604, a set priority of a business entity associated with the first device 110 among a plurality of business entities close to the geo-location of the first vehicle 402, trending information, or an emergency broadcast.

In accordance with an embodiment, the circuitry 202 may be further configured to receive a user input from the user terminal 112 of the first occupant 604 of the first vehicle 402. The user input may correspond to a user preference for a type of the first information 204A from the first device 110. The circuitry 202 may further receive the first information 204A from the first device 110 based on the received user input.

In accordance with an embodiment, the circuitry 202 may be further configured to control the display device 606 associated with one of the first vehicle 402 or the user terminal 112 to display recommendation information for reception of the first information 204A. The user terminal 112 may be associated with the first occupant 604 of the first vehicle 402. The recommendation information may be based on one of a stored preference history of the first occupant for the reception of the first information 204A, a recommendation from a third-party application subscribed by the first occupant 604, or a recommendation from a user of the third-party application different from the first occupant 604.

In accordance with an embodiment, the first device 110 may be associated with a second vehicle (such as the second vehicle 704). The circuitry 202 may be further configured to transmit the first voice message 710 spoken by the first occupant 604 of the first vehicle 402 to the first device 706 of the second vehicle 704. The second vehicle 704 may be within a threshold distance with respect to the first vehicle 402 based on the determined relative position. The circuitry 202 may receive, from the first device 706, the second voice message 712 spoken by the second occupant 708 of the second vehicle 704. The second voice message 712 may corresponds to the first information. The circuitry 202 may further control the first set of audio output devices of plurality of audio output devices 108 to output the second voice message 712 within the 3D space 306 of the first vehicle 402.

In accordance with an embodiment, the first device 110 may be associated with a second vehicle (such as the second vehicle 508). The circuitry 202 may be configured to transmit information related to first media content currently being played in the first vehicle 402 to the first device 706 of the second vehicle 508. The second vehicle 508 may be within a threshold distance with respect to the first vehicle 402 based on the determined relative position. The circuitry 202 may further receive information, related to second media content being played in the second vehicle 508, from the first device 706 of the second vehicle 508. The information related to the second media content may correspond to the first information 204A. The circuitry 202 may further control the first set of audio output devices to output the second media content within the 3D space 306 of the first vehicle 402.

In accordance with an embodiment, the circuitry 202 may be further configured to control the first set of audio output devices to output the second media content as a virtual sound source in the 3D space 306. The circuitry 202 may further switch from the first set of audio output devices to a second set of audio output devices of the plurality of audio output devices 108 to continuously change a position and volume of the virtual sound source in the 3D space 306. The position and the volume of the virtual sound source is changed based on a change in the position of the second vehicle 508 with respect to the first vehicle 402.

In accordance with an embodiment, the circuitry 202 may be further configured to enable or disable the transmission of the information, related to the first media content, to the first device in the second vehicle 508. The transmission may be enabled or disabled based on a user input of the first occupant 604 of the first vehicle 402.

In accordance with an embodiment, the circuitry 202 may be further configured to control an audio parameter of the first set of audio output devices related to a currently playing audio, based on reproduction timing information of the first 3D audio object corresponding to the received first information 204A. The reproduction timing information may indicate start timing and end timing of the output of the first 3D audio object.

In accordance with an embodiment, the circuitry 202 may be further configured to extract metadata 608 associated with the received first information 204A. The metadata 608 may include at least one of navigation information associated with a business entity within a threshold distance from the first vehicle 402, navigation information associated with a tourist landmark within the threshold distance from the first vehicle 402, a uniform resource locator (URL) to access a web page related to the first information 204A, or contact information of a second occupant of a second vehicle within the threshold distance from the first vehicle 402.

In accordance with an embodiment, the circuitry 202 may be further configured to control the display device 606 associated with one of the first vehicle 402 or the user terminal 112 to display the extracted metadata 608. The user terminal 112 may be associated with the first occupant 604 of the first vehicle 402.

In accordance with an embodiment, the circuitry 202 may be further configured to receive second information from the second device 412 based on a relative position of the second device 412 with respect to the first vehicle 402. The circuitry 202 may further generate the second 3D audio object 424 corresponding to the received second information based on the relative position of the second device 412 with respect to the first vehicle 402.

In accordance with an embodiment, the circuitry 202 may be further configured to control the plurality of audio output devices 108 to one of sequentially output the first 3D audio object 418 at the first time instant and the second 3D audio object 424 at a second time instant, based on a time synchronization between the first 3D audio object 418 and the second 3D audio object 424, or concurrently output the first 3D audio object 418 and the second 3D audio object 424 at different depths within the 3D space 306.

In accordance with an embodiment, the circuitry 202 may be further configured to execute the time synchronization based on one of the relative position of each of the first device 404 and the second device 412 with respect to the first vehicle 402, or a priority of a business entity associated with each of the first device 404 and the second device 412 among a plurality of business entities at the geo-location of the first vehicle 402.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system in a first vehicle, comprising:
   a plurality of sensors;
   a plurality of audio output devices; and
   circuitry communicatively coupled to the plurality of sensors and the plurality of audio output devices, wherein the circuitry is configured to:
      receive a plurality of signals from the plurality of sensors;
      determine a relative position between a first device and the first vehicle based on at least one of the received plurality of signals or a geo-location of the first vehicle;
      receive first information from the first device based on the determined relative position between the first device and the first vehicle, and at least one selection criterion;
      extract metadata associated with the received first information, wherein the metadata comprises at least one of navigation information associated with a business entity within a threshold distance from the first vehicle, navigation information associated with a tourist landmark within the threshold distance from the first vehicle, a uniform resource locator (URL) to access a web page related to the first information, or contact information of an occupant of a second vehicle within the threshold distance from the first vehicle;
      control a display device to display the extracted metadata;
      generate a first three-dimensional (3D) audio object corresponding to the received first information; and
      control, based on the determined relative position, a first set of audio output devices of the plurality of audio output devices to output the generated first 3D audio object, in a 3D space of the first vehicle at a first time instant.

2. The system according to claim 1, wherein
   the first device is associated with one of the business entity, the second vehicle, a traffic regulatory agency, an emergency regularity entity, or a tourist information center, and
   the first device one of transmits the first information to the first vehicle through a server, broadcasts the first information, or executes point-to-point communication of the first information with the first vehicle.

3. The system according to claim 1, wherein the first information corresponds to at least one of a promotional notification associated with one or more business entities within the threshold distance from the first vehicle based on the determined relative position, a notification associated with the tourist landmark within the threshold distance from the first vehicle, a notification related to an emergency within the threshold distance from the first vehicle, a broadcast related to traffic data around the first vehicle, or information of media content being played in the second vehicle within the threshold distance from the first vehicle.

4. The system according to claim 1, wherein the at least one selection criterion is based on at least one of a user preference associated with an occupant of the first vehicle for a specific type of the first information, a user preference history associated with the occupant of the first vehicle, a set priority of the business entity associated with the first device among a plurality of business entities close to the geo-location of the first vehicle, trending information, or an emergency broadcast.

5. The system according to claim 1, wherein the circuitry is further configured to:
   receive a user input from a user terminal of an occupant of the first vehicle, wherein the user input corresponds to a user preference for a type of the first information from the first device; and
   receive the first information from the first device based on the received user input.

6. The system according to claim 1, wherein
   the circuitry is further configured to control the display device associated with one of the first vehicle or a user terminal to display recommendation information for the reception of the first information,
   the user terminal is associated with an occupant of the first vehicle, and
   the recommendation information is based on one of a stored preference history of the occupant of the first vehicle for the reception of the first information, a recommendation from a third-party application subscribed by the occupant of the first vehicle, or a recommendation from a user of the third-party application different from the occupant of the first vehicle.

7. The system according to claim 1, wherein
   the first device is associated with the second vehicle, and
   the circuitry is further configured to:
      transmit a first voice message spoken by an occupant of the first vehicle to the first device of the second vehicle, wherein the second vehicle is within the threshold distance with respect to the first vehicle based on the determined relative position;
      receive, from the first device, a second voice message spoken by the occupant of the second vehicle, wherein the second voice message corresponds to the first information; and
      control the first set of audio output devices of the plurality of audio output devices to output the second voice message within the 3D space of the first vehicle.

8. The system according to claim 1, wherein
   the first device is associated with the second vehicle, and
   the circuitry is further configured to:
      transmit information related to first media content currently being played in the first vehicle to the first device of the second vehicle, wherein the second vehicle is within the threshold distance with respect to the first vehicle based on the determined relative position;
      receive information, related to second media content being played in the second vehicle, from the first device of the second vehicle, wherein the information related to the second media content corresponds to the first information; and
      control the first set of audio output devices to output the second media content within the 3D space of the first vehicle.

9. The system according to claim 8, wherein the circuitry is further configured to:
   control the first set of audio output devices to output the second media content as a virtual sound source in the 3D space; and
   switch from the first set of audio output devices to a second set of audio output devices of the plurality of audio output devices to continuously change a position and volume of the virtual sound source in the 3D space, wherein the position and the volume of the virtual sound source is changed based on a change in a position of the second vehicle with respect to the first vehicle.

10. The system according to claim 8, wherein
the circuitry is further configured to enable or disable the transmission of the information, related to the first media content, to the first device in the second vehicle, and
the transmission is enabled or disabled based on a user input of an occupant of the first vehicle.

11. The system according to claim 1, wherein
the circuitry is further configured to control an audio parameter of the first set of audio output devices related to a currently playing audio, based on reproduction timing information of the first 3D audio object corresponding to the received first information, and
the reproduction timing information indicates start timing and end timing of the output of the first 3D audio object.

12. The system according to claim 1, wherein
display device is associated with one of the first vehicle or a user terminal, and
the user terminal is associated with an occupant of the first vehicle.

13. The system according to claim 1, wherein the circuitry is further configured to:
receive second information from a second device based on a relative position of the second device with respect to the first vehicle; and
generate a second 3D audio object corresponding to the received second information based on the relative position of the second device with respect to the first vehicle.

14. The system according to claim 13, wherein the circuitry is further configured to control the plurality of audio output devices to one of:
sequentially output the first 3D audio object at the first time instant and the second 3D audio object at a second time instant, based on a time synchronization between the first 3D audio object and the second 3D audio object, or
concurrently output the first 3D audio object and the second 3D audio object at different depths within the 3D space.

15. The system according to claim 14, wherein the circuitry is further configured to execute the time synchronization based on one of:
the relative position of each of the first device and the second device with respect to the first vehicle, or
a priority of the business entity associated with each of the first device and the second device among a plurality of business entities at the geo-location of the first vehicle.

16. A method, comprising:
in a system comprising circuitry communicatively coupled to a plurality of sensors and a plurality of audio output devices:
receiving a plurality of signals from the plurality of sensors;
determining a relative position between a first device and a first vehicle based on at least one of the received plurality of signals or a geo-location of the first vehicle;
receiving first information from the first device based on the determined relative position between the first device and the first vehicle, and at least one selection criterion;
extracting metadata associated with the received first information, wherein the metadata comprises at least one of navigation information associated with a business entity within a threshold distance from the first vehicle, navigation information associated with a tourist landmark within the threshold distance from the first vehicle, a uniform resource locator (URL) to access a web page related to the first information, or contact information of an occupant of a second vehicle within the threshold distance from the first vehicle;
controlling a display device to display the extracted metadata;
generating a first three-dimensional (3D) audio object corresponding to the received first information; and
controlling, based on the determined relative position, a set of audio output devices of the plurality of audio output devices to output the generated first 3D audio object, in a 3D space of the first vehicle at a first time instant.

17. The method according to claim 16, further comprising:
receiving second information from a second device based on a relative position of the second device with respect to the first vehicle; and
generating a second 3D audio object corresponding to the received second information based on the relative position of the second device with respect to the first vehicle.

18. The method according to claim 17, further comprising controlling the plurality of audio output devices to one of:
sequentially output the first 3D audio object at the first time instant and the second 3D audio object at a second time instant, based on a time synchronization between the first 3D audio object and the second 3D audio object, or
concurrently output the first 3D audio object and the second 3D audio object at different depths within the 3D space.

19. A non-transitory computer-readable medium having stored thereon, computer-executable instructions that when executed by a processor communicatively coupled to a plurality of sensors and a plurality of audio output devices, causes the processor to execute operations, the operations comprising:
receiving a plurality of signals from the plurality of sensors;
determining a relative position between a specific device and a first vehicle based on at least one of the received plurality of signals or a geo-location of the first vehicle;
receiving specific information from the specific device based on the determined relative position between the specific device and the first vehicle, and at least one selection criterion;
extracting metadata associated with the received specific information, wherein the metadata comprises at least one of navigation information associated with a business entity within a threshold distance from the first vehicle, navigation information associated with a tourist landmark within the threshold distance from the first vehicle, a uniform resource locator (URL) to access a web page related to the specific information, or contact information of an occupant of a second vehicle within the threshold distance from the first vehicle;
controlling a display device to display the extracted metadata;
generating a three-dimensional (3D) audio object corresponding to the received specific information; and
controlling, based on the determined relative position, a set of audio output devices of the plurality of audio output devices to output the generated first 3D audio object, in a 3D space of the first vehicle at a specific time instant.

20. A system in a vehicle, comprising:
a plurality of sensors;
a plurality of audio output devices; and
circuitry communicatively coupled to the plurality of sensors and the plurality of audio output devices, wherein the circuitry is configured to:
receive a plurality of signals from the plurality of sensors;
determine a relative position between a specific device and the vehicle based on at least one of the received plurality of signals or a geo-location of the vehicle;
control a display device associated with one of the vehicle or a user terminal to display recommendation information for reception of specific information from the specific device, wherein
the user terminal is associated with an occupant of the vehicle, and
the recommendation information is based on one of a stored preference history of the occupant of the vehicle for the reception of the specific information, a recommendation from a third-party application subscribed by the occupant of the vehicle, or a recommendation from a user of the third-party application different from the occupant of the vehicle;
receive the specific information from the specific device based on:
the displayed recommendation information,
the determined relative position between the specific device and the vehicle, and
at least one selection criterion;
generate a three-dimensional (3D) audio object corresponding to the received specific information; and
control, based on the determined relative position, a set of audio output devices of the plurality of audio output devices to output the generated 3D audio object, in a 3D space of the vehicle at a specific time instant.

* * * * *